United States Patent [19]

Henis et al.

[11] 4,230,463

[45] Oct. 28, 1980

[54] MULTICOMPONENT MEMBRANES FOR GAS SEPARATIONS

[75] Inventors: Jay M. S. Henis; Mary K. Tripodi, both of Creve Coeur, Mo.

[73] Assignee: Monsanto Company, St. Louis, Mo.

[21] Appl. No.: 832,481

[22] Filed: Sep. 13, 1977

Related U.S. Application Data

[63] Continuation-in-part of Ser. No. 742,159, Nov. 15, 1976, abandoned.

[51] Int. Cl.² .......................................... B01D 59/14
[52] U.S. Cl. .......................................... 55/16; 55/68; 55/71; 55/73; 55/158; 210/500 M; 427/245
[58] Field of Search ................. 55/16, 158, 68–73; 210/22, 23 F, 23 H, 321 R, 490, 491, 500 M; 427/245; 428/304–306, 326, 327

[56] References Cited

U.S. PATENT DOCUMENTS

| | | | |
|---|---|---|---|
| 2,966,235 | 12/1960 | Kammermeyer | 55/16 |
| 3,022,187 | 2/1962 | Eyraud et al. | 55/16 X |
| 3,133,132 | 5/1964 | Loeb et al. | 210/23 H X |
| 3,335,545 | 8/1967 | Robb et al. | 55/158 X |
| 3,373,056 | 3/1968 | Martin | 427/245 |
| 3,428,476 | 2/1969 | Langley et al. | 55/16 X |
| 3,462,362 | 8/1969 | Kollsman | 210/321 R X |
| 3,556,305 | 1/1971 | Shorr | 210/490 |
| 3,556,992 | 1/1971 | Massucco | 210/490 X |
| 3,616,607 | 11/1971 | Klass et al. | 55/16 |
| 3,632,404 | 1/1972 | Desaulniers | 264/83 X |
| 3,657,113 | 4/1972 | Stancell et al. | 55/16 X |
| 3,660,281 | 5/1972 | Tober | 210/500 M X |
| 3,676,203 | 7/1972 | Sachs et al. | 210/500 M X |
| 3,754,375 | 8/1973 | Bouchilloux et al. | 55/16 |
| 3,775,308 | 11/1973 | Yasuda | 210/23 H |
| 3,797,202 | 3/1974 | Neulander et al. | 55/158 |
| 3,798,185 | 3/1974 | Skiens et al. | 260/2.5 M |
| 3,808,303 | 4/1974 | Ganci et al. | 210/500 M X |
| 3,830,733 | 8/1974 | Spivack et al. | 210/22 |
| 3,886,066 | 5/1975 | Chen et al. | 210/500 M X |
| 3,926,798 | 12/1975 | Cadotte | 210/23 H |
| 3,980,456 | 9/1976 | Browall | 55/158 |
| 4,005,012 | 1/1977 | Wrasidlo | 210/23 H |

FOREIGN PATENT DOCUMENTS

5255719  5/1977  Japan .......................................... 55/16

OTHER PUBLICATIONS

Chem. Abstracts, 87:54465v, vol. 87, 8/22/77, pp. 64 and 65.
NTIS PB-248 666, Cabasso et al., 7/1975, Research & Development of NS-1 and Related Polysulfone etc., pp. 1-145.
Cabasso et al., Polysulfone Hollow-Fibers for R.O. at High Pressures, 1975, pp. 492–497, ACS Div. of Org. Coatings etc. Papers, vol. 35(i).
Markley et al., *Membranes for Desalination by Reverse Osmosis*, U.S. Dept. of Interior, R & D Prog. Report, No. 281, Dec. 1967.

*Primary Examiner*—Robert H. Spitzer
*Attorney, Agent, or Firm*—Norman L. Balmer; Howard C. Stanley; James W. Williams, Jr.

[57] ABSTRACT

Multicomponent membranes for gas separation are disclosed which are effective for separating at least one gas from gaseous mixtures by permeation wherein the multicomponent membranes are comprised of a coating in occluding contact with a porous separation membrane. The multicomponent membranes advantageously exhibit less resistance to permeate gas flow for the at least one gas than for at least one remaining gas in the gaseous mixture. For at least one pair of gases the separation factor of the multicomponent membrane is significantly greater than the determined intrinsic separation factor of the material of the coating. Processes and apparatus for gas separation utilizing the multicomponent membranes are also disclosed.

78 Claims, 7 Drawing Figures

MULTICOMPONENT MEMBRANES FOR GAS SEPARATIONS

This is a continuation-in-part of application Ser. No. 742,159 filed Nov. 15, 1976, now abandoned, herein incorporated by reference.

This invention relates to multicomponent membranes for separating at least one gas from gaseous mixtures, to processes for selectively separating at least one gas from gaseous mixtures by permeation utilizing these multicomponent membranes, and to apparatus utilizing these multicomponent membranes.

Separating, including upgrading of the concentration of, at least one selected gas from a gaseous mixture is an especially important procedure in view of the demands on the supplies of chemical feedstocks. Frequently these demands are met by separating one or more desired gases from gaseous mixtures and utilizing the gaseous products for processing. Proposals have been made to employ separation membranes for selectively separating one or more gases from gaseous mixtures. To achieve selective separation the membrane exhibits less resistance to the transport of one or more gases than that of at least one other gas of the mixture. Thus, selective separation can provide preferential depletion or concentration of one or more desired gases in the mixture with respect to at least one other gas and therefore provide a product having a different proportion of the one or more desired gases to the at least one other gas than that proportion in the mixture. However, in order for selective separation of the one or more desired gases by the use of separation membranes to be commercially attractive, the membranes must not only be capable of withstanding the conditions to which they may be subjected during the separation operation, but also must provide an adequately selective separation of the one or more desired gases at a sufficiently high flux, i.e., permeation rate of the permeate per unit surface area, so that the use of the separation procedure is on an economically attractive basis. Thus, separation membranes which exhibit adequately high selective separation, but undesirably low fluxes, may require such large separating membrane surface area that the use of these membranes is not economically feasible. Similarly separation membranes which exhibit a high flux, but low selective separation, are also commercially unattractive. Accordingly, work has continued to develop separation membranes which can provide both an adequately selective separation of the one or more desired gases and a sufficiently high flux such that the use of these separation membranes on a commercial basis is economically feasible.

In general, the passage of a gas through a membrane may proceed through pores, i.e., continuous channels for fluid flow in communication with both feed and exit surfaces of the membrane (which pores may or may not be suitable for separation by Knudsen flow or diffusion); in another mechanism, in accordance with current views of membrane theory the passage of a gas through the membrane may be by interaction of the gas with the material of the membrane. In this latter postulated mechanism, the permeability of a gas through a membrane is believed to involve the solubility of the gas in the membrane material and the diffusion of the gas through the membrane. The permeability constant for a single gas is presently viewed as being the product of the solubility and diffusivity of that gas in the membrane. A given membrane material has a particular permeability constant for passage of a given gas by the interaction of the gas with the material of the membrane. The rate of permeation of the gas, i.e., flux, through the membrane is related to the permeability constant, but is also influenced by variables such as the membrane thickness, the physical nature of the membrane, the partial pressure differential of the permeate gas across the membrane, the temperature and the like.

DEVELOPMENT OF MEMBRANES FOR LIQUID SEPARATION

Heretofore, various modifications in membranes used for liquid separations have been proposed in attempts to solve particular problems associated with the separation operation. The following discussion is illustrative of specific modifications which have been made to membranes used for liquid separations to solve particular problems and provides a basis upon which the invention can be fully appreciated. For example, cellulosic membranes were first developed and utilized for the desalination of water, and these membranes could generally be described as "dense", or "compact", membranes. "Dense", or "compact", membranes are membranes which are essentially free of pores, i.e., fluid flow channels communicating between the surfaces of the membrane, and are essentially free of voids, i.e., regions within the thickness of the membrane which do not contain the material of the membrane. In the case of compact membranes, either surface is suitable for the feed contact surface, because properties of the compact membrane are the same from either surface direction, i.e., the membrane is symmetric. Since the membrane is essentially the same throughout the structure, it falls within the definition of isotropic membranes. Although some of these compact membranes are fairly selective, one of their main disadvantages is low permeate flux due to the relatively large thickness associated with the membranes. It has therefore been uneconomical to build equipment installations necessary for the desalination of appreciable quantities of water using compact membranes. Attempts to increase the flux of membranes for liquid separations have included, for example, adding fillers to the membrane to alter porosity and making the membranes as thin as possible to increase rates of permeate flow. Although improved permeation rates have been achieved to a limited degree, generally these improved rates have been obtained at the expense of the selectivity of the particular membranes.

In another attempt to improve membrane performances Loeb and his co-workers disclose in, for example, U.S. Pat. No. 3,133,132, a method for preparing a modified cellulose acetate membrane for desalination of water by first casting a solution of cellulose acetate as a thin layer, and then forming a dense membrane skin on the thin layer through various techniques such as solvent evaporation followed by quenching in cold water. The formation of these dense-skinned membranes generally involved a final annealing treatment in hot water. The membranes prepared by the Loeb method are composed of two distinct regions made of the same cellulose acetate material, a thin dense semi-permeable skin and a less dense, void-containing, non-selective support region. Since the membranes are not of essentially the same density throughout their structure, they fall within the definition of anisotropic membranes. Because of these distinct regions and the difference in membrane properties which can be observed depending on which surface of the membrane faces a brine feed solution, Loeb-type membranes can be described as being asymmetric.

In, for instance, practical desalination tests, asymmetric dense-skinned membranes have been shown to have superior permeate flux when compared to the older style compact membranes. The improvement in the permeation rate of the Loeb-type membranes has been attributed to the decrease in the thickness of the dense selective region. The less dense region in such a membrane provides sufficient structural support to prevent rupture of the membrane under operating pressures but offers little resistance to permeate flow. Hence, the separation is essentially accomplished by the dense skin, and the primary function of the less dense support region is to physically support the dense skin. However, in such Loeb-type membranes this less dense support region is frequently compacted by pressures such as those desirable for desalination of water and under such conditions the less dense support region loses come of its void volume. Consequently, the free flow of permeate away from the effluent side of the dense skin is hindered, resulting in a reduced permeation rate. Moreover, the cellulose acetate membranes disclosed by Loeb et al, are also subject to fouling and various chemical degradations. Therefore, attention has been directed to developing Loeb-type membranes of materials other than cellulose acetate which may provide stronger structural properties and increased chemical resistance. The "Loebing" of polymer materials to obtain a single component membrane exhibiting good selectivity and a good permeation rate has been found to be extremely difficult. Most attempts result in producing membranes which are either porous, i.e., have fluid flow channels through the dense skin, and will not separate, or which have too thick a dense skin to give useful permeation rates. Thus, those asymmetric membranes often fail to meet with acceptance in liquid separation operations such as reverse osmosis. As hereinafter further described, it is even more difficult to provide Loeb-type membranes which exhibit good selectivity and permeation rates for gas separation operations.

Further developments for providing advantageous separation membranes suitable for desalination of water and other liquid-liquid separations such as separations of organic materials from liquids have led to composite membranes comprising a porous support which, due to the presence of flow channels, can readily pass liquid, yet is sufficiently strong to withstand operating conditions and a thin semi-permeable membrane supported thereon. Composite membranes which have been proposed include the so-called "dynamically-formed" membranes which are formed by continuously depositing a polymeric film material from a feed solution on to a porous support. This continuous deposition is required because the polymeric film material is subject to being carried into the pores and through the porous substrate and hence needs to be replenished. Moreover, the polymeric film material is frequently sufficiently soluble in the liquid mixture being subjected to separation that it is also usually subject to lateral erosion, i.e., it washes off the support.

It has also been proposed to prepare composite desalination membranes by providing an essentially solid diffusion, or separation, membrane on a porous support. See, for instance Sachs, et. al., U.S. Pat. No. 3,676,203, who disclose a polyacrylic acid separation membrane on a porous support such as cellulose acetate, polysulfone, etc. The thickness of the separating membrane is relatively large, e.g. up to 60 microns, such that the separation membrane is sufficiently strong that it does not tend to flow into or rupture at the pores of the porous support. Other proposals have included the use of an anisotropic support having a denser region at the surface, i.e., skin, as the immediate support surface for the separation membrane. See, for instance, Cabasso, et. al., *Research and Development of NS-1 and Related Polysulfone Hollow Fibers for Reverse Osmosis Desalination of Seawater*, Gulf South Research Institute, July, 1975, distributed by National Technical Information Service, U.S. Department of Commerce, publication PB 248,666. Cabasso, et. al., disclose composite membranes for desalination of water which consist of anisotropic polysulfone hollow fibers which are coated with, e.g., polyethyleneimine which is cross-linked in situ or furfuryl alcohol which is polymerized in situ to provide a superimposed separation membrane. Another approach to providing reverse osmosis membranes has been disclosed by Shorr in U.S. Pat. No. 3,556,305. Shorr discloses tripartite separation membranes for reverse osmosis comprising of anisotropic porous substrate, an ultrathin adhesive layer over the porous substrate, and a thin semipermeable membrane bound to the substrate by the adhesive layer. Often, these ultrathin semipermeable membranes in composite form with porous support materials are prepared by separately fabricating the ultrathin membrane and a porous support followed by placing the two in surface-to-surface contact.

Other types of membranes which have been employed for treating liquids are the so-called "ultrafiltration" membranes in which pores of a desired diameter are provided. Sufficiently small molecules can pass through the pores whereas larger, more bulky molecules are retained on the feed surface of the membrane. An example of types of ultrafiltration membranes is provided by Massucco in U.S. Pat. No. 3,556,992. These membranes have an anisotropic support and a gel irreversibly compressed into the support to provide membranes having suitable pore sizes for the separation of caustic hydroxides from hemicellulose, and the ultrafiltration takes place through the gel.

DEVELOPMENT OF MEMBRANES FOR GAS SEPARATION

The above discussion of the background to this invention has been directed to membranes for the separation of a liquid from a liquid mixture such as in desalination of water. More recently emphasis has been placed on developing separation membranes which are suitable for separating a gas from a gaseous mixture. The permeation of gases through separation membranes has been the subject of various studies; however, gas separation membranes exhibiting both high flux and useful selective separations have apparently not been provided, at least commercially. The following discussion is illustrative of specific modifications which have been made to membranes used for gas separations and provides a basis upon which this invention can be fully appreciated.

Attempts have been made to draw on knowledge developed concerning liquid-liquid separation membranes. There are, however, many different considerations in developing a suitable separation membrane for gaseous systems as compared to developing a suitable membrane for liquid systems. For instance, the presence of small pores in the membrane may not unduly adversely affect the performance of the membrane for liquid separations such as desalination due to absorption on and swelling of the membrane and the high viscosity and the high cohesive properties of the liquids. Since gases have extremely low absorption, viscosity and cohesive properties, no barrier is provided to prevent the gases from readily passing through the pores in such a membrane resulting in little, if any, separation of gases. An extremely important difference between liquids and gases which might affect selective separation by permeation through membranes is the generally lower solubility of gases in membranes as compared to the solubility of liquids in such membranes, thus resulting in lower permeability constants for gases as compared to those of liquids. Other differences between liquids and gases which might affect selective separation by permeation through membranes include density and internal pressure, the effect of temperature on the viscosity, surface tension, and the degree of order.

It has been realized that materials which exhibit good separation of gases often have lower permeability constants compared to those of materials exhibiting poor separation of gases. In general, efforts have been directed to providing the material of a gas separation membrane in as thin a form as possible, in view of the low permeabilities, in order to provide adequate flux yet provide a membrane as pore-free as possible, such that gases are passed through the membrane by interaction with the material of the membrane. One approach to developing separation membranes suitable for gaseous systems has been to provide composite membranes having a superimposed membrane supported on an anisotropic porous support wherein the superimposed membrane provides the desired separation, i.e., the superimposed membrane is semi-permeable. The superimposed membranes are advantageously sufficiently thin, i.e., ultrathin, to provide reasonable fluxes. The essential function of the porous support is to support and protect the superimposed membrane without harming the delicate, thin superimposed membrane. Suitable supports provide low resistance to permeate passage after the superimposed membrane has performed its function of selectively separating the permeate from the feed mixture. Thus, these supports are desirably porous to provide low resistance to permeate passage and yet sufficiently supportive, that is, having pore sizes sufficiently small to prevent the rupture of the superimposed membrane under separating conditions. Klass, et. al., U.S. Pat. No. 3,616,607, Stancell, et. al., U.S. Pat. No. 3,657,113 and Yasuda, U.S. Pat. No. 3,775,303 exemplify gas separation membranes having superimposed membranes on a porous support.

Such composite membranes for gas separations have not been without problems. For instance, Browall in U.S. Pat. No. 3,980,456 discloses the fabrication of composite membrane films for separation of oxygen from air comprising a support of microporous polycarbonate sheet and a separately formed, i.e., preformed, superimposed ultrathin separation membrane of 80 percent poly(phenylene oxide) and 20 percent organopolysiloxane-polycarbonate copolymer. In the fabrication of the membranes the exclusion from the manufacturing area of extremely small particulate impurities, i.e., particles below about 3000 angstroms in size, is stated by Browall to be impractical or impossible. These fine particles may be deposited under or between performed ultrathin membrane layers and, because of their large size in comparison to the ultrathin membranes, puncture the ultrathin membranes. Such breaches reduce the effectiveness of the membrane. The Browall patent discloses applying a preformed organopolysiloxane-polycarbonate copolymer sealing material over the ultrathin membrane to cover the breaches caused by the fine particles. Browall also discloses employing a preformed layer of the organopolysiloxane-polycarbonate copolymer between the ultrathin membrane and the porous polycarbonate support as an adhesive. Thus the composite membranes of Browall are complex in materials and techniques of construction.

In summary, apparently suitable anisotropic membranes have not been provided for gas separations which, in the absence of a superimposed membrane to provide the selective separation, exhibit sufficient flux and selectivity of separation for general commercial operations. It further appears that composite membranes for gas separation which have a superimposed membrane to provide the selective separation have achieved only slight or modest improvement in membrane performance, and there appears to be no successful, large scale commercial application of these gas separation membranes. Moreover, the superimposed membrane, although possibly ultrathin in order to provide the desired selectivity of separation, may significantly reduce the flux of the permeate gas through the composite membrane as compared to that of the porous support not having the superimposed membrane thereon.

SUMMARY OF THE INVENTION

This invention pertains to particular multicomponent, or composite, membranes for gas separations comprising a coating in contact with a porous separation membrane wherein the separation properties of the multicomponent membranes are principally determined by the porous separation membrane as opposed to the material of the coating, processes for gas separation employing the multicomponent membranes, and apparatus for gas separations utilizing the multicomponent membranes. These multicomponent membranes for the separation of at least one gas from a gaseous mixture can exhibit a desirable selectivity and still exhibit a useful flux. This invention provides multicomponent membranes for gas separation which can be fabricated from a wide variety of gas separation membrane materials and thus enable greater latitude than has heretofore existed in selecting such a membrane material which is advantageous for a given gas separation. This invention provides multicomponent membranes in which desired combinations of flux and selectivity of separation can be provided by the configuration and methods of preparation and combination of the components. Thus, a material having high selectivity of separation, but a relatively low permeability constant, can be utilized to provide multicomponent membranes having desirable permeation rates and desirable selectivity of separation. Moreover, the membranes of this invention can be relatively insensitive to the effects of contamination, i.e., fine particles having their preparation which has previously caused difficulty in preparing composite membranes of a preformed ultrathin separating membrane superimposed on a support. Advantageously, the use of adhesives in preparing the multicomponent membranes of this invention may not be necessary. Hence, multicomponent membranes of this invention need not be complex in techniques of construction. Multicomponent membranes in accordance with this invention can be prepared to provide high structural strength, toughness, and abrasion and chemical resistances, yet exhibit commercially advantageous flux and selective separation. These multicomponent membranes can also possess desirable handling characteristics such as low susceptibility to static electrical forces, low adhesion to adjacent multicomponent membranes and the like.

DEFINITION OF TERMS

In accordance with this invention, the multicomponent membranes for gas separation comprise a porous separation membrane having feed and exit surfaces and a coating material in contact with the porous separation membrane. The porous separation membrane has essentially the same composition, or material, throughout its structure, i.e., the porous separation membrane is substantially chemically homogenous. The material of the porous separation membrane exhibits selective permeation for at least one gas of a gaseous mixture over that of at least one remaining gas of the mixture, and hence the porous separation membrane is defined as a "separation" membrane. By describing the separation membrane as "porous" it is meant that the membrane has continuous channels for gas flow, i.e., pores, which communicate between the feed surface and exit surface. These continuous channels, if sufficiently large in number and in cross-section, can permit essentially all of a gaseous mixture to flow through the porous separation membrane with little, if any, separation due to interaction with the material of the porous separation membrane. This invention advantageously provides multicomponent membranes wherein the separation of at least one gas from a gaseous mixture by interaction with the material of the porous separation membrane is enhanced, as compared to that of the porous separation membrane alone.

The multicomponent membranes of this invention comprise porous separation membranes and coatings which have particular relationships. Some of these relationships can conveniently be stated in terms of relative separation factors with respect to a pair of gases for the porous separation membranes, coatings and the multicomponent membranes. A separation factor ($\alpha a/b$) for a membrane for a given pair of gases a and b is defined as the ratio of the permeability constant ($P_a$) of the membrane for gas a to the permeability constant ($P_b$) of the membrane for gas b. A separation factor is also equal to the ratio of the permeability ($P_a/l$) of a membrane of thickness l for gas a of a gas mixture to the permeability of the same membrane to gas b, ($P_b/l$) wherein the permeability for a given gas is the volume of gas, standard temperature and pressure (STP), which passes through a membrane per square centimeter of surface area, per second, for a partial pressure drop of 1 centimeter of mercury across the membrane per unit of thickness, and is expressed as $P = cm^3/cm^2\text{-sec-cmHg}/l$.

In practice, the separation factor with respect to a given pair of gases for a given membrane can be determined employing numerous techniques which provide sufficient information for calculation of permeability constants or permeabilities for each of the pair of gases. Several of the many techniques available for determining permeability constants, permeabilities, and separation factors is disclosed by Hwang, et. al., *Techniques of Chemistry*, Volume VII, *Membranes in Separations*, John Wiley & Sons, 1975 (herein incorporated by reference) at Chapter 12, pages 296 to 322.

An intrinsic separation factor as referred to herein is the separation factor for a material which has no channels for gas flow across the material, and is the highest achievable separation factor for the material. Such a material may be referred to as being continuous or nonporous. The intrinsic separation factor of a material can be approximated by measuring the separation factor of a compact membrane of the material. However, several difficulties may exist in the determination of an intrinsic separation factor including imperfections introduced in the preparation of the compact membrane such as the presence of pores, the presence of fine particles in the compact membrane, undefined molecular order due to variations in membrane preparation, and the like. Consequently, the determined intrinsic separation factor can be lower than the intrinsic separation factor. Accordingly, a "determined intrinsic separation factor" as employed herein refers to the separation factor of a dry compact membrane of the material.

BRIEF STATEMENTS OF THE INVENTION

A multicomponent membrane for gas separations in accordance with this invention exhibits, with respect to at least one pair of gases, a separation factor which is significantly greater than the determined intrinsic separation factor of the coating material in occluding contact with a porous separation membrane. By the term "significantly greater" in describing the relationships of the separation factor of the multicomponent membrane and the determined intrinsic separation factor of the coating material, it is meant that the difference in the separation factors is of import, e.g., is generally at least about 5 or 10 percent greater. By the term "occluding contact", it is meant that the coating contacts the porous separation membrane such that in the multicomponent membrane the proportion of gases passing through the material of the porous separation membrane to gases passing through the pores is increased compared to that porportion in the porous separation membrane alone. Thus, the contact is such that in the multicomponent membrane an increased contribution of the material of the porous separation membrane to the separation factor exhibited by the multicomponent membrane for at least one pair of gases is obtained as compared to that contribution in the porous separation membrane alone. Accordingly, with respect to said at least one pair of gases, the separation factor which is exhibited by the multicomponent membrane will be greater than the separation factor exhibited by the porous separation membrane. Also, with respect to said at least one pair of gases, the separation factor exhibited by the multicomponent membrane is often equal to or less than the determined intrinsic separation factor of the material of the porous separation membrane. Often, regardless of the intended gas separation application of the multicomponent membrane, the relationships of separation factors can be demonstrated for at least one pair of gases which consists of one of hydrogen, helium, ammonia, and carbon dioxide and one of carbon monoxide, nitrogen, argon, sulfur hexafluoride, methane, and ethane. Also, in some multicomponent membranes of this invention the relationships of separation factors may be demonstrated for a pair of gases which consists of carbon dioxide and one of hydrogen, helium, and ammonia, or ammonia and one of carbon dioxide, hydrogen, and helium.

Desirably a multicomponent membrane in accordance with this invention exhibits a separation factor, with respect to at least one pair of gases, which is at least about 35 percent greater, and is preferably at least about 50 percent greater, and sometimes is at least about 100 percent greater, than the determined intrinsic separation factor of the material of the coating. Frequently, with respect to said at least one pair of gases, the separation factor of the multicomponent membrane is at least about 5, often at least about 10 percent greater, and sometimes at least about 50 or about 100 percent greater, than that of the porous separation membrane.

There are several features to this invention. One feature pertains to multicomponent membranes for gas separations, a second feature pertains to processes for gas separations using the multicomponent membranes, and a third feature pertains to apparatus for conducting gas separations, which apparatus contain the multicomponent membranes.

In the feature of this invention pertaining to multicomponent membranes, one aspect involves multicomponent membranes comprising a coating in occluding contact with a porous separation membrane of a material, which material exhibits selective permeation of at least one gas in a gaseous mixture over that of one or more remaining gases in the gaseous mixture, said porous separation membrane having a substantial void volume, wherein the multicomponent membrane exhibits, with respect to at least one pair of gases, a separation factor significantly greater than the determined intrinsic separation factor of the material of the coating. Voids are regions within the porous separation membrane which are vacant of the material of the porous separation membrane. Thus, when voids are present, the density of the porous separation membrane is less than the density of the bulk material of the porous separation membrane. By describing the void volume as "substantial" it is meant that sufficient voids, e.g., at least about 5 percent by volume voids, are provided within the thickness of the porous separation membrane to provide a realizable increase in permeation rate through the membrane as compared to the permeation rate observable through a compact membrane of the same material and thickness. Preferably the void volume is up to about 90, say, about 10 to 80, and sometimes about 20 or 30 to 70, percent based on the superficial volume, i.e., the volume contained within the gross dimensions, of the porous separation membrane. One method for determining the void volume of a porous separation membrane is by a density comparison with a volume of the bulk material of the porous separation membrane which volume would correspond to a membrane of the same gross physical dimensions and configurations as the porous separation membrane. Hence, the bore of a hollow fiber porous separation membrane would not affect the density of the porous separation membrane.

The density of the porous separation membrane can be essentially the same throughout its thickness, i.e., isotropic, or the porous separation membrane can be characterized by having at least one relatively dense region within its thickness in barrier relationship to gas flow across the porous separation membrane, i.e., the porous separation membrane is anisotropic. The coating is preferably in occluding contact with the relatively dense region of the anisotropic porous separation membrane. Since the relatively dense region can be porous, it can more easily be made quite thin as compared to making a compact membrane of the same thickness. The use of porous separation membranes having relatively dense regions which are thin provides enhanced flux through the multicomponent membrane.

In a further aspect of the feature of the invention relating to multicomponent membranes, the multicomponent membranes comprise a coating in occluding contact with a porous separation membrane of a material, which material exhibits selective permeation of at least one gas in a gaseous mixture over that of one or more remaining gases in the gaseous mixture, wherein the coating is applied using an essentially liquid substance which is suitable for forming the coating, and wherein, with respect to at least one pair of gases, the multicomponent membrane exhibits a separation factor significantly greater than the determined intrinsic separation factor of the material of the coating. The substance for application to the porous separation membrane is essentially liquid in that it is incapable of maintaining a form in the absence of external support. The material of the coating may be liquid, or may be dissolved in or suspended as a finely divided solid (e.g., colloidal size) in a liquid menstruum, to provide the essentially liquid substance for application to the porous separation membrane. Advantageously, the material of the coating, or the material of the coating in the liquid menstruum, wets, i.e., tends to adhere to, the material of the porous separation membrane. Thus, the contact of the coating with the porous separation membrane is frequently facilitated. The use of an essentially liquid substance to provide the coating on the porous separation membrane enables simpler techniques to be employed than have been employed in providing composite membranes of separately formed, solid materials. Moreover, a wide range of materials for the coating can be employed, and the application techniques can readily be adapted to the use of porous separation membranes of various configurations.

In an additional aspect of the feature of this invention relating to the multicomponent membranes, the multicomponent membranes comprise a coating in occluding contact with a porous separation membrane comprising polysulfone wherein, with respect to at least one pair of gases, the multicomponent membrane exhibits a separation factor significantly greater than the determined intrinsic separation factor of the material of the coating. In another aspect of this feature the multicomponent membranes comprise a coating in occluding contact with a hollow fiber porous separation membrane of material, which material exhibits selective permeation of at least one gas in a gaseous mixture over that of one or more remaining gases in the gaseous mixture wherein, with respect to at least one pair of gases, the multicomponent membrane exhibits a separation factor significantly greater than the determined intrinsic separation factor of the material of the coating. In hollow filaments (i.e., hollow fibers) the exterior surface can be the feed or exit surface of the porous separation membrane and the interior surface will be the exit or feed surface, respectively. Hollow filaments advantageously facilitate providing gas separation apparatus having high available surface areas for separation within the given volumes of the apparatus. Hollow filaments are known to be able to withstand greater pressure differentials than unsupported films of essentially the same total thickness and morphology.

A second feature of this invention pertains to processes for gas separation employing the multicomponent membranes. In this feature of the invention at least one gas in a gaseous mixture is separated from at least one other gas by selective permeation to provide a permeated product containing at least one permeating gas. The process comprises: contacting the gaseous mixture with one surface (feed surface) of a multicomponent membrane, which, with respect to at least one pair of gases in the gaseous mixture, multicomponent membrane exhibits selective permeation of one gas of the pair of gases over that of the remaining gas of the pair of gases; maintaining the opposite surface (exit surface) of the multicomponent membrane at a lower chemical potential for the at least one permeating gas than the chemical potential at the said one surface; permeating said at least one permeating gas into and through the multicomponent membrane; and removing from the vicinity of said opposite surface a permeated product having a different proportion of said at least one gas of the gaseous mixture to said at least one other gas of the gaseous mixture than the proportion in the gaseous mixture of said at least one gas to said at least one other gas. The separation processes of this invention include concentrating the said at least one gas on the feed side of the multicomponent membrane to provide a concentrated product and include permeating the said at least one gas through the multicomponent membrane to provide a permeated product wherein said different proportion is a higher proportion.

In one aspect of this feature, the multicomponent membrane comprises a coating in occluding contact with a porous separation membrane having a substantial void volume. In another aspect of this feature of the invention, hydrogen is selectively separated from a gaseous mixture also comprising at least one of carbon monoxide, carbon dioxide, helium, nitrogen, oxygen, argon, hydrogen sulfide, nitrous oxide, ammonia, and hydrocarbon of 1 to about 5 carbon atoms. In a further aspect of this feature of the invention, at least one gas in a gaseous mixture is separated from at least one other gas involving contacting the gaseous mixture with a multicomponent membrane comprising a coating in occluding contact with a porous separation membrane comprising polysulfone.

A further feature of this invention pertains to apparatus for gas separations which utilize multicomponent membranes in accordance with this invention. The apparatus comprises an enclosure having at least one multicomponent membrane in accordance with this invention therein, said multicomponent membrane having a feed surface and an opposing exit surface, and said enclosure having means to enable a gaseous mixture to be supplied to and means to enable removal of gases from the vicinity of the feed surface of the multicomponent membrane, and means to enable a permeated product to be removed from the vicinity of the exit surface of the multicomponent membrane.

It has surprisingly been found that a material for the coating which can have a low determined intrinsic separation factor can be provided on a porous separation membrane, which porous separation membrane can have a low separation factor, to provide a multicomponent membrane having a separation factor greater than either the coating or porous separation membrane. This result is quite surprising in contrast to previous proposals for gas separation composite membranes having a superimposed membrane supported on a porous support which have essentially required that the superimposed membrane exhibit a high separation factor in order to provide the selective separation for the membrane. The finding that coatings exhibiting low separation factors can be employed in conjunction with porous separation membranes to provide multicomponent membranes having a greater separation factor than each of the coating and porous separation membrane leads to highly advantageous multicomponent membranes for separating gases. For instance, materials having desirable intrinsic separation factors, but which were difficult to utilize as superimposed membranes, may be used as the material of the porous separation membrane in accordance with this invention with the selectivity of separation of the material of the porous separation membrane contributing significantly to the separation factor of the multicomponent membrane.

It can clearly be seen that the porous separation membrane of the multicomponent membranes can be anisotropic with a thin, but relatively dense, separating region. Thus, the porous separation membrane can take advantage of the low resistance to permeation offered by anisotropic membranes yet provide multicomponent membranes which exhibit desirable separation factors. Furthermore, the presence of flow channels which can render unicomponent (non-composite) anisotropic membranes unacceptable for gas separations, can be acceptable, and even desirable, in porous separation membranes used in the multicomponent membranes of this invention. The coating can preferably provide a low resistance to permeation, and the material of the coating exhibit a low determined intrinsic separation factor. In some multicomponent membranes, the coating may tend to selectively reject the desired permeate gas, yet the resulting multicomponent membrane using that coating can exhibit a separation factor greater than that of the porous separation membrane.

This invention is concerned with the multicomponent membranes formed through the combination of a preformed porous separation membrane, i.e., a porous separation membrane which is prepared prior to application of the coating, and a coating. The invention particularly relates to multicomponent gas separation membranes wherein the selectivity of separation of the material of the porous separation membrane contributes significantly to the selectivity of and relative permeation rates of the permeate gases through the multicomponent membrane. The multicomponent membranes according to the invention can, in general, exhibit higher rates of permeation than do composite membranes described previous to this invention which utilize superimposed membranes exhibiting high separation factors. In addition, the multicomponent membranes of this invention provide a separation factor which is superior to those of the coating and porous separation membrane. The multicomponent membranes of the invention may be in some ways analogous, but only superficially, to the gas separation membranes described previous to this invention which have superimposed membranes exhibiting a high separation factor on a porous support. These composite membranes described previous to this invention do not utilize a support or substrate which provides a substantial proportion of the separation.

The multicomponent membranes of the invention allow great flexibility for making specific separations because both the coating and the porous separation membrane contribute toward the overall separation performance. The result is an increased ability to tailor these membranes for specific separation requirements, e.g., for the separation of desired gas or gases from various gas mixtures at commercially desirable combinations of rate and selectivity of separation. The multicomponent membranes can be fabricated from a wide variety of gas separation materials and thus provide a greater latitude than has heretofore existed in selecting an advantageous membrane material for a given gas separation. In addition, these multicomponent membranes are capable of providing good physical properties such as toughness, abrasion resistance, strength and durability, and good chemical resistance.

DETAILED DESCRIPTION OF THE INVENTION

The invention pertains to particular multicomponent membranes for gas separations which comprise a coating in contact with a porous separation membrane in which the separation properties of the multicomponent membrane are principally determined by the porous separation membrane as opposed to the coating, processes for gas separation employing the multicomponent membranes and apparatus for gas separations utilizing the multicomponent membranes.

The multicomponent membranes are widely applicable in gas separation operations. Gaseous mixtures suitable for feeds according to the invention are comprised of gaseous substances, or substances that are normally liquid or solid but are vapors at the temperature under which the separation is conducted. The invention as described in detail hereinafter pertains chiefly to the separation of, for example, oxygen from nitrogen; hydrogen from at least one of carbon monoxide, carbon dioxide, helium, nitrogen, oxygen, argon, hydrogen sulfide, nitrous oxide, ammonia, and hydrocarbon of 1 to about 5 carbon atoms, especially methane, ethane, and ethylene; ammonia from at least one of hydrogen, nitrogen, argon, and hydrocarbon of 1 to about 5 carbon atoms, e.g., methane; carbon dioxide from at least one of carbon monoxide and hydrocarbon of 1 to about 5 carbon atoms, e.g., methane; helium from hydrocarbon of 1 to 5 carbon atoms, e.g., methane; hydrogen sulfide from hydrocarbon of 1 to about 5 carbon atoms, for instance, methane, ethane, or ethylene; and carbon monoxide from at least one of hydrogen, helium, nitrogen, and hydrocarbon of 1 to about 5 carbon atoms. It is emphasized that the invention is not restricted to these particular separation applications or gases nor the specific multicomponent membranes in the examples.

The multicomponent membranes for gas separation, according to the invention, can be films or hollow filaments, or fibers, having a porous separation membrane, or substrate, and a coating in occluding contact with the porous separation membrane. Some factors which influence the behavior of the multicomponent membranes are the permeability constants of the materials of the coating and porous separation membranes, the total cross-sectional area of the holes (i.e., pores or flow channels) relative to the total surface area of the porous separation membrane, the relative thickness of each of the coating and the porous separation membrane of the multicomponent membrane, the morphology of the porous separation membrane, and most importantly the relative resistance to permeate flow of each of the coating and the porous separation membrane in a multicomponent membrane. In general, the degree of separation of the multicomponent membrane is influenced by the relative resistance to gas flow for each gas in the gas mixture of the coating and the porous separation membrane, which can be specifically chosen for their gas flow resistance properties.

The material used for the porous separation membrane may be a solid natural or synthetic substance having useful gas separation properties. In the case of polymers, both addition and condensation polymers which can be cast, extruded or otherwise fabricated to provide porous separation membranes are included. The porous separation membranes can be prepared in porous form, for example, by casting from a solution comprised of a good solvent for the polymeric material into a poor or nonsolvent for the material. The spinning and/or casting conditions and/or treatments subsequent to the initial formation, and the like, can influence the porosity and resistance to gas flow of the porous separation membrane.

Generally organic or organic polymers mixed with inorganics are used to prepare the porous separation membrane. Typical polymers suitable for the porous separation membrane according to the invention can be substituted or unsubstituted polymers and may be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polysulfides; polymers from monomers having alpha-olefinic unsaturation other than mentioned above such as poly (ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly (benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Selection of the porous separation membrane for the present multicomponent membrane for gas separations may be made on the basis of the heat resistance, solvent resistance, and mechanical strength of the porous separation membrane, as well as other factors dictated by the operating conditions for selective permeation, as long as the coating and porous separation membrane have the prerequisite relative separation factors in accordance with the invention for at least one pair of gases. The porous separation membrane is preferably at least partially self-supporting, and in some instances may be essentially self-supporting. The porous separation membrane may provide essentially all of the structural support for the membrane, or the multicomponent membrane may include a structural support member which can provide little, if any, resistance to the passage of gases.

One of the preferred porous separation membranes utilized in forming the multicomponent membranes comprises polysulfone. Among the polysulfones which may be utilized are those having a polymeric backbone comprised of the repeating structural unit:

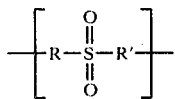

where R and R' can be the same or different and are aliphatic or aromatic hydrocarbyl-containing moieties, say, of 1 to about 40 carbon atoms, wherein the sulfur in the sulfonyl group is bonded to aliphatic or aromatic carbon atoms, and the polysulfone has an average molecular weight suitable for film or fiber formation, often at least about 8000 or 10,000. When the polysulfone is not cross-linked, the molecular weight of the polysulfone is generally less than about 500,000, and is frequently less than about 100,000. The repeating units may be bonded, i.e., R and R' may be bonded, by carbon to carbon bonds or through various linking groups such as

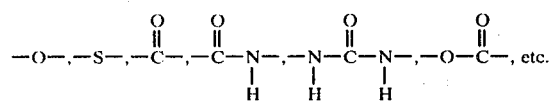

Particularly advantageous polysulfones are those in which at least one of R and R' comprises an aromatic hydrocarbyl-containing moiety and the sulfonyl moiety is bonded to at least one aromatic carbon atom. Common aromatic hydrocarbyl-containing moieties comprise phenylene and substituted phenylene moieties; bisphenyl and substituted bisphenyl moieties, bisphenyl methane and substituted bisphenyl methane moieties having the nucleus

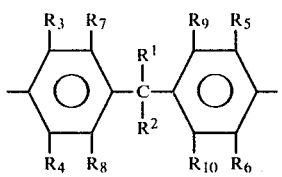

substituted and unsubstituted bisphenyl ethers of formula

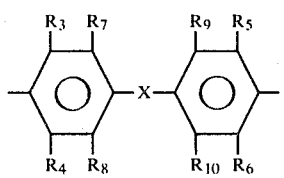

wherein X is oxygen or sulfur; and the like. In the depicted bisphenyl methane and bisphenyl ether moieties $R_1$ to $R_{10}$ represent substituents which may be the same or different and have the structure

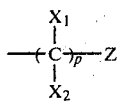

wherein $X_1$ and $X_2$ are the same or different and are hydrogen or halogen (e.g., fluorine, chlorine, and bromine); p is 0 or an integer, e.g., of 1 to about 6; and Z is hydrogen, halogen (e.g., fluorine, chlorine and bromine), $-(Y)_qR_{11}$ (in which q is 0 or 1, Y is $-O-$, $-S-$, $-SS-$,

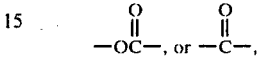

and $R_{11}$ is hydrogen, substituted or unsubstituted alkyl, say, of 1 to about 8 carbon atoms, or substituted or unsubstituted aryl, say, monocyclic or bicyclic of about 6 to 15 carbon atoms), heterocyclic with the heteroatom being at least one of nitrogen, oxygen and sulfur and being monocyclic or bicyclic with about 5 to 15 ring atoms, sulfato and sulfono, especially lower alkyl-containing or monocyclic or bicyclic aryl-containing sulfato or sulfono, phosphorous-containing moieties such as phosphino and phosphato and phosphono, especially lower alkyl-containing or monocyclic or bicyclic aryl-containing phosphato or phosphono, amine including primary, secondary, tertiary and quaternary amines in which the secondary, tertiary and quaternary amines often contain lower alkyl or monocyclic or bicyclic aryl moieties, isothioureyl, thioureyl, guanidyl, trialkylsilyl, trialkylstannyl, trialkylplumbyl, dialkylstibinyl, etc. Frequently, the substituents on the phenylene groups of the bisphenyl methane and bisphenyl ether moieties are often provided at the ortho position, i.e., $R_7$ to $R_{10}$ are hydrogen. The polysulfones having aromatic hydrocarbyl-containing moieties in general possess good thermal stability, are resistant to chemical attack, and have an excellent combination of toughness and flexibility. Useful polysulfones are sold under trade names such as "P-1700", and "P-3500" by Union Carbide, both commercial products having a linear chain of the general formula

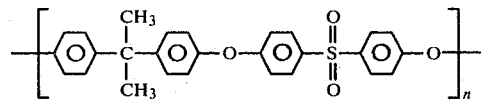

where n, representing the degree of polymerization, is about 50 to 80. Other useful polysulfones are sold under the trade name "ASTREL 360 Plastic" by the 3M Company. Poly(arylene ether) sulfones are also advantageous. Polyether sulfones having the structure

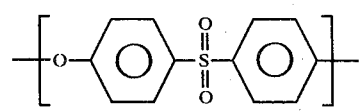

and available from ICI, Ltd., Great Britain, are also useful. Still other useful polysulfones could be prepared through polymer modifications, for example, by cross-linking, grafting, quaternization, and the like.

In making hollow filament porous separation membranes, a wide variety of spinning conditions may be employed. One method for the preparation of polysulfone hollow filaments is disclosed by Cabasso, et al, in *Research and Development of NS-1 and Related Polysulfone Hollow Fibers for Reverse Osmosis Desalination of Seawater*, supra. Particularly advantageous hollow fibers of polysulfones, e.g., of P-3500 polysulfone produced by Union Carbide and polyether sulfones of ICI, Ltd., can be prepared by spinning the polysulfone in a solution comprised of solvent for the polysulfone. Typical solvents are dimethylformamide, dimethylacetamide and N-methyl pyrrolidone. The weight percent polymer in the solution may vary widely but is sufficient to provide a hollow fiber under the spinning conditions. Often, the weight percent of polymer in the solution is about 15 to 50, e.g., about 20 to 35. If the polysulfone and/or solvent contain contaminants, such as water, particulates, etc., the amount of contaminants should be sufficiently low to permit spinning. If necessary, contaminants can be removed from the polysulfone and/or solvent. The size of the spinning jet will vary with the desired inside and outside diameters of the product hollow filament. One class of spinning jets may have orifice diameters of about 15 to 35 mils and pin diameters of about 8 to 15 mils with an injection capillary within the pin. The diameter of injection capillary may vary within the limits established by the pin. The spinning solution is frequently maintained under a substantially inert atmosphere to prevent contamination and/or coagulation of the polysulfone prior to spinning and to avoid undue fire risks with volatile and flammable solvents. A convenient atmosphere is dry nitrogen. The presence of excessive amounts of gas in the spinning solution may result in the formation of large voids.

The spinning may be conducted using a wet jet or dry jet technique, i.e., the jet may be in or removed from the coagulating bath. The wet jet technique is often used for the sake of convenience. The spinning conditions are preferably not such that the filament is unduly stretched. Frequently, spinning speeds are within the range of about 5 to 100 meters per minute although higher spinning speeds can be employed providing the filament is not unduly stretched and sufficient residence time is provided in the coagulation bath. Any essentially non-solvent for the polysulfone can be employed for the coagulation bath. Conveniently, water is employed as the primary material in the coagulation bath. A fluid is commonly injected into the inside of the fiber. The fluid may comprise, e.g., air, isopropanol, water, or the like. The residence time for the spun fiber in the coagulation bath is at least sufficient to ensure solidification of the filament. The temperature of the coagulation bath may also vary widely, e.g., from −15° to 90° C. or more, and is most often about 1° to 35° C., say, about 2° to 8° or 10° C. The coagulated hollow fiber is desirably washed with water to remove solvent and may be stored in a water bath for periods of time of at least about two hours. The fibers are generally dried prior to application of the coating and assembly in an apparatus for gas separations. The drying may be conducted at about 0° to 90° C., conveniently about room temperature, e.g., about 15° to 35° C., and at about 5 to 95, preferably about 40 to 60, percent relative humidity.

The foregoing description of methods for preparing hollow filament porous separation membranes of polysulfone is provided merely to illustrate techniques which are available for producing porous separation membranes and is not in limitation of the invention.

The coating may be in the form of an essentially non-interrupted membrane, i.e., an essentially non-porous membrane, in contact with the porous separation membrane, or the coating may be discontinuous, or interrupted. When the coating is interrupted, it is sometimes referred to as an occluding material since it may occlude channels for gas flow, i.e., pores. Preferably, the coating is not so thick as to adversely affect the performance of the multicomponent membrane, e.g., by causing an undue decrease in flux or by causing such a resistance to gas flow that the separation factor of the multicomponent membrane is essentially that of the coating. Often the coating may have an average thickness of up to about 50 microns. When the coating is interrupted, of course, there may be areas having no coating material. The coating may often have an average thickness ranging from about 0.0001 to 50 microns. In some instances, the average thickness of the coating is less than about 1 micron, and may even be less than about 5000 angstroms. The coating may comprise one layer or at least two separate layers which may or may not be of the same materials. When the porous separation membrane is anisotropic, i.e., has a relatively dense region within its thickness in gas flow barrier relationship, the coating is desirably applied to be in occluding contact in the relatively dense region. A relatively dense region may be at either or both surfaces of the porous separation membrane or may be at a mid-portion of the thickness of the porous separation membrane. The coating is conveniently applied to at least one of the feed and exit surfaces of the porous separation membrane, and when the multicomponent membrane is a hollow fiber, the coating may be applied to the outside surface to also provide protection to and/or facilitate the handling of the multicomponent membrane.

While any suitable method can be employed, the method by which the coating is applied can have some bearing on the overall performance of the multicomponent membranes. The multicomponent membranes according to the invention can be prepared for instance, by coating a porous separation membrane with a substance containing the material of the coating such that in the multicomponent membrane the coating has a resistance to gas flow which is low in comparison to the total resistance of the multicomponent membrane. The coating may be applied in any suitable manner, e.g., by a coating operation such as spraying, brushing, immersion in an essentially liquid substance comprising the material of the coating or the like. As stated earlier, the material of the coating is preferably contained in an essentially liquid substance when applied and may be in a solution using a solvent for the material of the coating which is substantially a non-solvent for the material of the porous separation membrane. Advantageously, the substance containing the material of the coating is applied to one surface of the porous separation membrane, and the other side of the porous separation membrane is subjected to a lower absolute pressure. If the essentially liquid substance comprises polymerizable material and the polymerizable material is polymerized after application to the porous separation membrane to provide the coating, the other surface of the porous separation membrane is advantageously subjected to a lower absolute pressure during or before the polymerization. However, the invention itself is not limited by the particular method by which the material of the coating is applied.

Particularly advantageous materials for the coating have relatively high permeability constants for gases such that the presence of a coating does not unduly reduce the permeation rate of the multicomponent membrane. The resistance to gas flow of the coating is preferably relatively small in comparison to the resistance of the multicomponent membrane. As stated previously, the selection of materials for the coating depends on the determined intrinsic separation factor of the material of the coating relative to the determined intrinsic separation factor of the material of the porous separation membrane to provide a multicomponent membrane exhibiting a desired separation factor. The material of the coating should be capable of providing occluding contact with the porous separation membrane. For instance, when applied it should sufficiently wet and adhere to the porous separation membrane to enable occluding contact to occur. The wetting properties of the material of the coating can be easily determined by contacting the material of the coating, either alone or in a solvent, with the material of the porous separation membrane. Moreover, based on estimates of the average pore diameter of the porous separation membrane, materials for the coating of appropriate molecular size can be chosen. If the molecular size of the material of the coating is too large to be accommodated by the pores of the porous separation membrane, the material may not be useful to provide occluding contact. If, on the other hand, the molecular size of the material for the coating is too small, it may be drawn through the pores of the porous separation membrane during coating and/or separation operations. Thus with porous separation membranes having larger pores, it may be desirable to employ materials for coating having larger molecular sizes than with smaller pores. When the pores are in a wide variety of sizes, it may be desirable to employ a polymerizable material for the coating material which is polymerized after application to the porous separation membrane, or to employ two or more coating materials of different molecular sizes, e.g., by applying the materials of the coating in order of their increasing molecular sizes.

The materials for the coating may be natural or synthetic substances, and are often polymers, and advantageously exhibit the appropriate properties to provide occluding contact with the porous separation membrane. Synthetic substances include both addition and condensation polymers. Typical of the useful materials which can comprise the coating are polymers which can be substituted or unsubstituted, and which are solid or liquid under gas separation conditions, and include synthetic rubbers; natural rubbers; relatively high molecular weight and/or high boiling liquids; organic prepolymers; poly(siloxanes) (silicone polymers); polysilazanes; polyurethanes; poly(epichlorhydrin); polyamines; polyimines; polyamides; acrylonitrile-containing copolymers such as poly($\alpha$-chloroacrylonitrile) copolymers; polyesters (including polylactams and polyarylates), e.g., poly(alkyl acrylates) and poly(alkyl methacrylates) wherein the alkyl groups have, say, 1 to about 8 carbons, polysebacates, polysuccinates, and alkyd resins; terpinoid resins; linseed oil; cellulosic polymers; polysulfones, especially aliphatic-containing polysulfontes; poly(alkylene glycols) such as poly(ethylene glycol), poly(propylene glycol), etc.; poly(alkylene) polysulfates; polypyrrolidones; polymers from monomers having $\alpha$-olefinic unsaturation such as poly(olefins), e.g., poly(ethylene), poly(propylene), poly(butadiene), poly(2,3-dichlorobutadiene), poly(isoprene), poly(chloroprene), poly(styrene) including poly(styrene) copolymers, e.g., styrene-butadiene copolymer, polyvinyls such as poly(vinyl alcohols), poly(vinyl aldehydes) (e.g., poly(vinyl formal) and poly(vinyl butyral)), poly(vinyl ketones) (e.g., poly(methylvinylketone)), poly(vinyl esters) (e.g., poly(vinyl benzoate)), poly(vinyl halides) (e.g., poly(vinyl bromide)), poly(vinylidene halides), poly(vinylidene carbonate), poly(N-vinylmaleimide), etc., poly(1,5-cyclooctadiene), poly(methylisopropenylketone), fluorinated ethylene copolymer; poly(arylene oxides), e.g., poly(xylylene oxide); polycarbonates; polyphosphates, e.g., poly(ethylene-methylphosphate); and the like, and any interpolymers including block interpolymers containing repeating units from the above, and grafts and blends containing any of the foregoing. The polymers may or may not be polymerized after application to the porous separation membrane.

Particularly useful materials for coatings comprise poly(siloxanes). Typical poly(siloxanes) can comprise aliphatic or aromatic moieties and often have repeating units containing 1 to about 20 carbon atoms. The molecular weight of the poly(siloxanes) may vary widely, but is generally at least about 1000. Often, the poly(siloxanes) have a molecular weight of about 1,000 to 300,000 when applied to the porous separation membrane. Common aliphatic and aromatic poly(siloxanes) include the poly(monosubstituted and disubstituted siloxanes), e.g., wherein the substituents are lower aliphatic, for instance, lower alkyl, including cycloalkyl, especially methyl, ethyl, and propyl, lower alkoxy; aryl including mono or bicyclic aryl including bis phenylene, naphthalene, etc.; lower mono and bicyclic aryloxy; acyl including lower aliphatic and lower aromatic acyl; and the like. The aliphatic and aromatic substituents may be substituted, e.g., with halogens, e.g., fluorine, chlorine and bromine, hydroxyl groups, lower alkyl groups, lower alkoxy groups, lower acyl groups and the like. The poly(siloxane) may be cross-linked in the presence of a cross-linking agent to provide a silicone rubber, and the poly(siloxane) may be a copolymer with a cross-linkable comonomer such as $\alpha$-methylstyrene to assist in the cross-linking. Typical catalysts to promote cross-linking include the organic and inorganic peroxides. The cross-linking may be prior to application of the poly(siloxane) to the porous separation membrane, but preferably the poly(siloxane) is cross-linked after being applied to the porous separation membrane. Frequently, the poly(siloxane) has a molecular weight of about 1,000 to 100,000 prior to cross-linking. Particularly advantageous poly(siloxanes) comprise poly(dimethylsiloxane), poly(phenylmethylsiloxane), poly(trifluoropropylmethylsiloxane), copolymer of $\alpha$-methylstyrene and dimethylsiloxane, and post-cured poly(dimethylsiloxane)-containing silicone rubber having a molecular weight of about 1,000 to 50,000 prior to cross-linking. Some poly(siloxanes) do not sufficiently wet a polysulfone porous separation membrane to provide as much occluding contact as is desired. However, dissolving or dispersing the poly(siloxane) in a solvent which does not substantially affect the polysulfone can facilitate obtaining occluding contact. Suitable solvents include normally liquid alkanes, e.g., pentane, cyclohexane, etc.; aliphatic alcohols, e.g., methanol; some halogenated alkanes; and dialkyl ethers; and the like; and mixtures thereof.

The following materials for porous separation membranes and coating are representative of useful materials and their combinations to provide the multicomponent membranes of this invention and gas separations for which they may be employed. These materials, combinations, and applications, however, are only representative of the wide range of materials useful in the invention and, are not provided in limitation of the invention, but only serve to illustrate the broad application of the benefits thereof. Typical materials for porous separation membranes for separation of oxygen from nitrogen include cellulose acetate, e.g., cellulose acetate having a degree of substitution of about 2.5; polysulfone; styrene-acrylonitrile copolymer, e.g., having about 20 to 70 weight percent styrene and about 30 to 80 weight percent acrylonitrile, blends of styrene-acrylonitrile copolymers, and the like. Suitable coating materials include poly(siloxanes) (polysilicones), e.g., poly(dimethylsiloxane), poly(phenylmethylsiloxane), poly(trifluoropropylmethylsiloxane), pre-vulcanized and post-vulcanized silicone rubbers, etc.; poly(styrene), e.g., poly(styrene) having a degree of polymerization of about 2 to 20; poly(isoprene), e.g., isoprene prepolymer and poly(cis-1,4-isoprene); aliphatic hydrocarbyl-containing compounds having about 14 to 30 carbon atoms, e.g., hexadecane, linseed oil, especially raw linseed oil, etc.; and the like.

Typical materials for porous separation membranes for separation of hydrogen from gaseous mixtures containing hydrogen include cellulose acetate, e.g., cellulose acetate having a degree of substitution of about 2.5; polysulfone; styrene-acrylonitrile copolymer, e.g., having about 20 to 70 weight percent styrene and about 30 to 80 weight percent acrylonitrile, blends of styrene-acrylonitrile copolymers, etc.; polycarbonates; poly(arylene oxides) such as poly(phenylene oxide), poly(xylylene oxide), brominated poly(xylylene oxide), brominated poly(xylylene oxide) post treated with trimethylamine, thiourea, etc.; and the like. Suitable coating materials include poly(siloxane) (polysilicones); e.g., poly(dimethylsiloxane), pre-vulcanized and post-vulcanized silicone rubber, etc.; poly(isoprene); α-methylstyrene-dimethylsiloxane block copolymer; aliphatic hydrocarbylcontaining compounds having about 14 to 30 carbon atoms; and the like.

The porous separation membranes used in this invention are advantageously not unduly porous and thus provide sufficient area of the porous separation membrane material for effecting separation on a commercially attractive basis. The porous separation membranes significantly effect the separation of the multicomponent membranes of this invention, and accordingly, it is desirable to provide a large ratio of total surface area to total pore cross-sectional area in the porous separation membrane. This result is clearly contrary to the objectives of the prior art in preparing composite membranes wherein the superimposed membrane substantially achieves the separation, and the supports are desirably provided as porous as possible consistent with their primary function, i.e., supporting the superimposed membrane, and advantageously the support does not interfere with the permeate gas either in slowing or inhibiting the gas flow from the superimposed membrane.

Clearly, the amount of gas passing through the material of the porous separation membrane and its influence on the performance of the multicomponent membranes of the invention is affected by the ratio of total surface area to total pore cross-sectional area and/or the average pore diameter of the porous separation membrane. Frequently, the porous separation membranes have ratios of total surface area to total pore cross-sectional area of at least about 10:1, preferably at least about $10^3$:1, and some porous separation membranes may have ratios of about $10^3$:1 to $10^8$:1 or $10^{12}$:1. The average pore cross-sectional diameter may vary widely and may often be in the range of about 5 to 20,000 angstroms, and in some porous separation membranes, particularly in some polysulfone porous separation membranes, the average pore cross-sectional diameter may be about 5 to 1000 or 5000, even about 5 to 200, angstroms.

The coating is preferably in occluding contact with the porous separation membrane such that, with respect to the models which have been developed based on observation of the performance of the multicomponent membranes of this invention, increased resistance to the passage of gases through the pores of the separation membrane is provided, and the proportion of gases passing through the material of the porous separation membrane to gases passing through the pores is enhanced over that proportion using the porous separation membrane not having the coating.

A useful characteristic with respect to gas separation membranes is the effective separating thickness. The effective separating thickness as employed herein is the thickness of a continuous (non-porous) and compact membrane of the material of the porous separation membrane which would have the same permeation rate for a given gas as the multicomponent membrane, i.e., the effective separating thickness is the quotient of the permeability constant of the material of the porous separation membrane for a gas divided by the permeability of the multicomponent membrane for the gas. By providing lower effective separating thicknesses, the rate of permeation for a particular gas is increased. Often the effective separating thickness of the multicomponent membranes is substantially less than the total membrane thickness, especially when the multicomponent membranes are anisotropic. Frequently, the effective separating thickness of the multicomponent membranes with respect to a gas, which can be demonstrated by at least one of carbon monoxide, carbon dioxide, nitrogen, argon, sulfur hexafluoride, methane and ethane, is less than about 100,000, preferably less than about 15,000, say, about 100 to 15,000 angstroms. In multicomponent membranes comprising, e.g., polysulfone porous separation membranes, the effective separating thickness of the multicomponent membrane for at least one of said gases is desirably less than about 5000 angstroms. In some multicomponent membranes the effective separating thickness, especially with respect to at least one of said gases is less than about 50, preferably less than about 20, percent of the thickness of the multicomponent membrane.

Prior to the invention, one method for preparing membranes for gas separations from membranes containing pores has been to treat at least one surface of the membrane containing the pores to densify the surface and thereby decrease the presence of pores, which pores decrease the selectivity of separation of the membrane. This densification has been by, for instance, chemical treatment with solvents or swelling agents for the material of the membrane or by annealing which can be conducted with or without the contact of a liquid with the membrane. Such densification procedures usually result in a substantial decrease in flux through the membrane. Some particularly advantageous multicomponent membranes of this invention exhibit a greater permeability than that of a membrane substantially the same as the porous separation membrane used in the multicomponent membrane except that at least one surface of the membrane has been treated to sufficiently densify the membrane or sufficiently annealed, with or without the presence of a liquid to provide, with respect to at least one pair of gases, a separation factor equal to or greater than the separation factor exhibited by the multicomponent membrane. Another method for increasing the selectivity of separation of a membrane is to modify the conditions of its manufacture such that it is less porous than a membrane produced under the unmodified conditions. Generally, the increase in selectivity of separation due to conditions of manufacture is accompanied by a substantially lower flux through the membrane. Some particularly advantageous multicomponent membranes of this invention, for instance, those in which the porous separation membrane is an anisotropic hollow fiber, exhibit a greater permeability than an anisotropic hollow fiber membrane consisting of the material of the porous separation membrane, which membrane is capable of maintaining the configuration of the hollow fiber under gas separation conditions, e.g., absolute pressure differentials of at least about 10 kilograms per square centimeter, and which anisotropic hollow fiber membrane exhibits, with respect to at least one pair of gases, a separation factor equal to or greater than the separation factor of the multicomponent membrane.

Advantageously, the porous separation membrane is sufficiently thick that no special apparatus is required for its handling. Frequently, the porous separation membrane has a thickness of about 20 to 500, say, about 50 to 200, or 300 microns. When the multicomponent membrane is in the configuration of a hollow fiber, the fiber may often have an outside diameter of about 200 to 1000, say, about 200 to 800, microns and wall thicknesses of about 50 to 200 or 300 microns.

In conducting gaseous separations, including concentrations, employing the multicomponent membranes of this invention the exit side of the multicomponent membrane is maintained at a lower chemical potential for at least one permeating gas than the chemical potential at the feed side. The driving force for the desired permeation through the multicomponent membrane is a differential in chemical potential across the multicomponent membrane such as described by Olaf A. Hougen and K. M. Watson in *Chemical Process Principles*, Part II, John Wiley, New York (1947), for instance, as provided by a differential in partial pressure. Permeating gas passes into and through the multicomponent membrane and can be removed from the vicinity of the exit side of the multicomponent membrane to maintain the desired driving force for the permeating gas. The functionality of the multicomponent membrane does not depend upon the direction of gas flow or the surface of the membrane which is first contacted by a gaseous feed mixture.

In addition to providing a process for separating at least one gas from gaseous mixtures which does not require costly refrigeration and/or other costly energy inputs, the present invention provides numerous benefits with a high degree of flexibility in selective permeation operations. The multicomponent gas separation membranes, whether in sheet or hollow fiber form, are useful in the separation of industrial gases, oxygen enrichment for medical applications, pollution control devices, and any need where it is desired to separate at least one gas from gaseous mixtures. Relatively infrequently does a single component membrane possess both a reasonably high degree of selectivity of separation and good permeation rate characteristics, and even then these single component membranes are suitable for separating only a few specific gases. The multicomponent gas separation membranes according to the invention may employ a wide variety of materials for the porous separation membranes which previously have not been desirable as single component membranes for gas separation due to undesirable combinations of permeation rates and separation factor. Since the selection of the material of the porous separation membrane can be based on its selectivity and permeability constants for given gases rather than its ability to form thin and essentially pore-free membranes, the multi-component membranes of this invention can advantageously be tailored for separations of a wide variety of gases from gaseous mixtures.

MATHEMATICAL MODEL

The cross-sectional diameter of pores in a porous separation membrane may be on the order of angstroms, and accordingly the pores of the porous separation membrane and the interface between the coating and the porous separation membrane are not directly observable employing presently available optical microscopes. Presently available techniques which can offer larger magnification of a specimen such as scanning electron microscopy and transmission electron microscopy, involve special specimen preparations which limit their viability in accurately depicting features of the specimen, particularly an organic specimen. For instance, in scanning electron microscopy, an organic specimen is coated, e.g., with at least 40 or 50 angstrom thick layer of gold, in order to produce the reflectance which provides the perceived image. Even the manner in which the coating is applied can affect the perceived image. Furthermore, the mere presence of the coating required for scanning electron microscopy can obscure, or apparently change, features of the specimen. Moreover, in both scanning electron microscopy and transmission electron microscopy the methods used for obtaining a sufficiently small portion of the specimen may substantially alter features of the specimen. Consequently, the complete structure of a multicomponent membrane can not be visually perceived, even with the best microscopic techniques available.

The multicomponent membranes of this invention do perform uniquely, and mathematical models can be developed which, as demonstrated by various techniques, generally correlate with the observed performance of a multicomponent membrane of this invention. The mathematical models, however, are not in limitation of the invention, but rather serve to further illustrate the benefits and advantages provided by the invention.

For a better understanding of the following mathematical model of multicomponent membranes of this invention, reference can be made to the depicted models provided as FIGS. 1, 2, 3, 4, 6 and 7 of the drawings. The depicted models are only intended to facilitate the understanding of the concepts developed in the mathematical model and do not, and are not intended to, depict actual structures of the multicomponent membranes of the invention. Furthermore, consistent with the purpose of assisting in understanding the concepts of the mathematical model, the depicted models illustrate the presence of features involved in the mathematical model; however, the depicted models are greatly exaggerated with respect to the relative relationships among these features in order to facilitate observing the features. FIG. 5 is provided to assist in demonstrating the analogy between the concept of resistance to permeate flow of the mathematical model and resistance to electrical flow.

FIGS. 1, 2 and 4 are depicted models for purposes of understanding the mathematical model and illustrate an interface of coating and a porous separation membrane, i.e., an enlarged region, indicated in FIG. 6 as that region between lines A—A and B—B, but not necessarily on the same scale. FIG. 3 is an enlarged depicted model of the region indicated in FIG. 7 as that region between lines C—C and D—D. In the depicted models, like designations refer to the same features.

FIG. 1 is an enlarged cross-sectional view, for illustrative purposes, of one depicted model of an essentially continuous and non-interrupted overlay 1 of the material X of the coating in contact with material Y of a porous separation membrane with solid portions 2 having pores 3 filled or partially filled by the material of X;

FIG. 4 in cooperation with FIG. 5 demonstrates an analogy with the well-known electrical current resistance circuit illustrated in FIG. 5;

Figure 6:
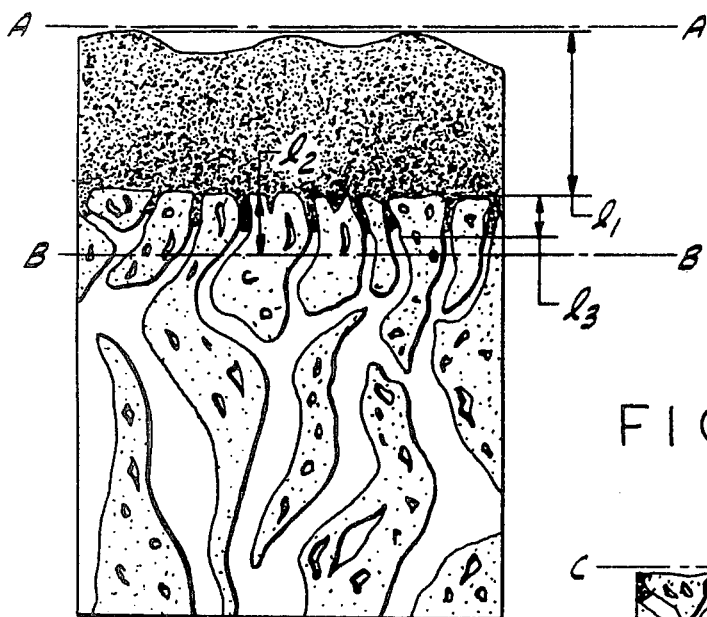
Figure 7:
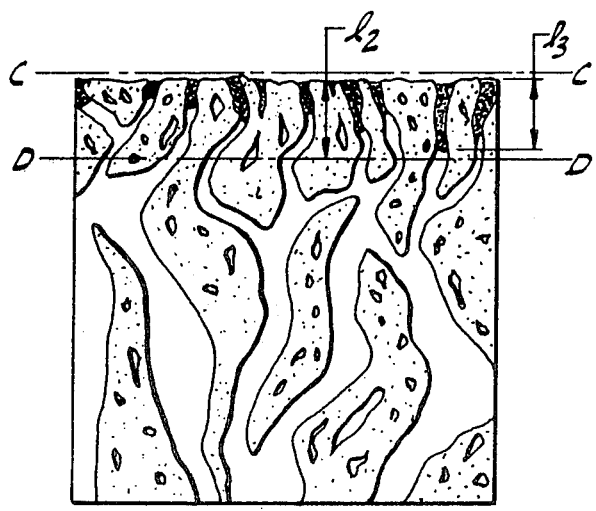

FIG. 6 is yet another cross-sectional view of a depicted model in which material X of the coating is provided as a pore-blocking film cast on a denser surface of the porous separation membrane, which is characterized by a reciprocally graduated density and porous structure through the membrane thickness; and FIG. 7 is a cross-sectional view of a depicted model of an occluded anisotropic separation membrane which does not of necessity require a continuous or uninterrupted overlay 1.

The following equations illustrate a mathematical model which has been developed to explain the observed performances of the multicomponent membranes of this invention. By appropriate use of this mathematical model, porous separation membranes and materials for coatings can be chosen which will provide advantageous multicomponent membranes of this invention.

As will be demonstrated below, the flux, $Q_{T,a}$, for gas a through a multicomponent membrane can be represented as a function of the resistance to flow of gas a through each portion (see, for instance the depicted model of FIG. 4) of the multicomponent membrane by analogy to the mathematically equivalent electrical circuit of FIG. 5.

$$Q_{T,a} = \Delta p_{T,a} \left[ 1 + \frac{R_{1,a}(R_{2,a} + R_{3,a})}{R_{2,a} R_{3,a}} \right]^{-1} \left[ \frac{R_{2,a} + R_{3,a}}{R_{2,a} R_{3,a}} \right] \quad (1)$$

where $\Delta p_{T,a}$ is the pressure differential for gas a across the multicomponent membrane and $R_{1,a}$, $R_{2,a}$, and $R_{3,a}$ represent the resistance to flow of gas a of the overlay 1, the solid portions 2 of the porous separation membrane, and the pores 3 of the porous separation membrane, respectively. The flux, $Q_{T,b}$, of a second gas b through the same multicomponent membrane can be expressed in the same manner, but with the appropriate terms for the pressure differential of gas b and the resistances to flow of gas b through the overlay 1, the solid portions 2 of the porous separation membrane and the pores 3. Each of these resistances for gas b can be different than each of those for gas a. Thus selective permeation can be achieved by the multicomponent membrane. Advantageous multicomponent membranes can be modeled by varying $R_1$, $R_2$, and $R_3$ relative to each other for each of gases a and b to produce desirable calculated fluxes for each of gases a and b, and by varying the resistances for gas a relative to those for gas b to provide a calculated selective permeation of gas a over gas b.

Other equations which are useful in understanding the mathematical model are listed below.

For any given separating material, the separation factor for two gases a and b, $\alpha_b{}^a$, is defined by Equation 2 for a membrane of material n of a given thickness l and surface area A:

$$\alpha_b{}^a = \frac{P_{n,a}}{P_{n,b}} = \frac{Q_a \Delta p_b}{Q_b \Delta p_a} \quad (1)$$

where $P_{n,a}$ and $P_{n,b}$ are the respective permeability constants of material n for gases a and b, and $Q_a$ and $Q_b$ are the respective fluxes of gases a and b through the membrane when $\Delta p_a$ and $\Delta p_b$ are the driving forces, i.e., partial pressure drops, for gases a and b across the membrane. The flux $Q_a$ through a membrane of material n for gas a can be expressed as $$Q_a = \frac{\Delta p_a P_{n,a} A_n}{l_n} = \frac{\Delta p_a}{R_{n,a}} \quad (3)$$

where $A_n$ is the surface area of the membrane of material n, $l_n$ is the thickness of the membrane of material n, and $R_{n,a}$ is defined for the purposes of the model as the resistance of a membrane of material n to the flow of gas a.

From Equation 3 it can be seen that the resistance $R_{n,a}$ is represented mathematically by Equation 4.

$$R_{n,a} = \frac{l_n}{P_{n,a} A_n} \quad (4)$$

This resistance is analogous in a mathematical sense to the electrical resistance of a material to current flow.

Figure 4:
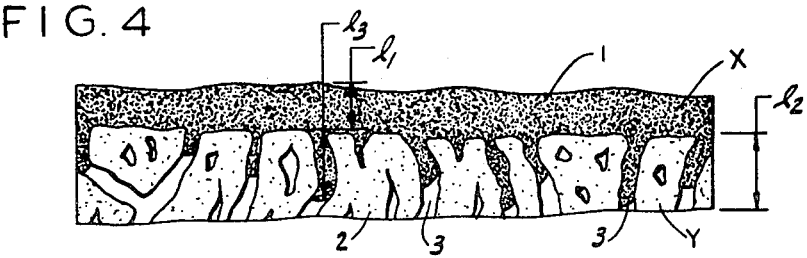
FIG. 4 is still another depicted model to assist in describing concepts in accordance with the mathematical model of the invention.

For the purposes of illustrating this mathematical model, reference can be made to the depicted model of, for instance, FIG. 4. The porous separation membrane is represented as comprising solid portions 2 of material Y and pores, or holes 3. Material X is present in the depicted model of FIG. 4 as overlay 1 and as the material which enters into the pores 3 of the porous separation membrane. Each of these regions, the overlay 1, the solid portions 2 of the porous separation membrane, and the pores 3 containing material X, has a resistance to gas flow such that the total multicomponent membrane can be compared to the analogous electrical circuit represented in FIG. 5, in which a resistance, $R_1$, is in series with two resistances, $R_2$ and $R_3$, which are in parallel.

If material X is provided in the form of a continuous, compact overlay 1, then its resistance $R_1$ to flow for a given gas can be represented by Equation 4 and will be a function of the thickness, $l_1$, of the overlay, the surface area, $A_1$, of the overlay, and the permeability constant, $P_X$, of the material X.

The porous separation membrane of a multicomponent membrane of this invention is represented by the model as two resistances in parallel. In accordance with Equation 4, the resistance $R_2$ of the solid portions 2 of the porous separation membrane, comprising material Y, is a function of the thickness $l_2$ of these solid portions, the total surface area $A_2$ of the solid portions 2, and the permeability constant $P_Y$ of material Y. The resistance $R_3$ of the pores 3 in the porous separation membrane is in parallel to $R_2$. The resistance $R_3$ of the pores is represented, as in Equation 4, by a thickness $l_3$ divided by a permeability constant $P_3$ and a total pore cross-sectional surface area $A_3$. For the purposes of the mathematical model, the assumption is made that $l_3$ is represented by the average depth of the penetration of material X into the pores 3, as illustrated in the depicted model of FIG. 4, and the permeability constant $P_3$ is represented by the permeability constant $P_X$ of material X present in the pores.

The permeability constants, $P_X$ and $P_Y$, are measurable properties of materials. The surface area $A_1$ can be established by the configuration and size of the multicomponent membrane, and surface areas $A_2$ and $A_3$ can be determined, or limits to them can be estimated, using conventional scanning electron microscopy in combination with procedures based on gas flow measurements of the porous separation membrane. The thickness $l_1$, $l_2$ and $l_3$ can be determined in the same manner. Thus, $Q_{T,a}$ for a multicomponent membrane can be calculated from Equations 1 and 4 using values for $\Delta p_{T,a}$, $l_1$, $l_2$, $l_3$, $P_X$, $P_Y$, $A_1$, $A_2$ and $A_3$ which may be established. The separation factor ($\alpha_b{}^a$) can also be determined in a like manner from Equations 1 and 2.

The mathematical model may be of assistance in developing advantageous multicomponent membranes of this invention. For instance, since the separation of at least one gas in a gaseous mixture from at least one remaining gas is substantially effected by the porous separation membrane in particularly advantageous multicomponent membranes, a material for the porous separation membrane can be selected on the basis of its determined intrinsic separation factor for said gases as well as its physical and chemical properties such as strength, toughness, durability, chemical resistance, and the like. The material can then be made into porous membrane form using any suitable technique. The porous separation membrane can be characterized, as stated above, by scanning electron microscopy, preferably in combination with gas flow measurement techniques such as described by H. Yasuda et al, *Journal of Applied Science*, Vol. 18, p. 805-819 (1974).

The porous separation membrane can be represented, for the purposes of the model, as two resistances to gas flow in parallel, the solid portions 2 and the pores 3. The resistance of the pores, $R_3$, is dependent upon the average size of the pores, which determines whether the gas flow through the pores will be laminar flow or Knudsen diffusive flow (as discussed, for example in Hwang, et al, supra at p. 50 ff), and on the number of pores. Since the diffusion rates for gases through open pores is much greater than through solid materials, the calculated resistance to gas flow of the pores, $R_3$, is usually substantially less than the calculated resistance of the solid portions, $R_2$, of the porous separation membrane, even when the total pore cross-sectional area is much less than the total surface area of the solid portions. In order to cause an increase in the proportion of permeate gas flow through the solid portions 2 with respect to flow through the pores 3, the resistance of the pores, $R_3$, must be increased relative to the resistance of the solid portions, $R_2$. This can be accomplished, in accordance with this model, by placing a material X in the pores to decrease the diffusion rate of gases through the pores.

Upon obtaining an estimation of the resistance to gas flow through the pores and having knowledge of the resistance to gas flow of the material of the porous separation membrane, the desired increase in resistance to gas flow through the pores necessary to provide a multicomponent membrane having a desired separation factor can be estimated. Conveniently, but not necessarily, it can be assumed that the depth of the material of the coating in the pores ($l_3$) and the distance ($l_2$) of minimum permeation of the gas through the material of the porous separation membrane are the same. Then, based on knowledge of the permeability constants of materials for coatings, a material for the coating can be selected to provide the desired resistance. The material for the coating can also be selected for other properties, in addition to increasing $R_3$, as will be described below. If the material for the coating also forms an overlay on the porous separation membrane, as illustrated in FIG. 4, it can decrease the flux. Such a situation is described according to the mathematical model by Equation 1. In such a case the properties of the material of the coating should also be such that the flux is not unduly reduced.

The selection of a material for the coating depends on its determined intrinsic separation factor relative to the determined intrinsic separation factor of the material of the porous separation membrane and its ability to provide the desired resistance in the multicomponent membrane. The material of the coating should be capable of occluding contact with the porous separation membrane. Based on the average pore size of the porous separation membrane, materials for the coating of appropriate molecular size can be chosen. If the molecular size of the coating is too large, or if the coating material bridges the pores at the surface, the model provides that the resistance of the pores, $R_3$, would not be increased relative to the resistance, $R_2$, of the solid portions of the porous separation membrane, and in such a case, the proportion of gases permeating through the solid portions 2 relative to gases diffusing through the pores would not be increased with respect to that proportion in the porous separation membrane alone. If, on the other hand, the molecular size of the material of the coating is too small, it may be drawn through the pores during coating and/or separation operations.

Frequently, the coating is provided in the form of an overlay 1 (see the depicted model of FIG. 4) in addition to the material of the coating which enters the pores. In these instances, the overlay 1 represents a resistance to gas flow, $R_1$, which is in series with the combined resistances of the porous separation membrane. When this situation occurs, the material of the coating should be advantageously selected such that the overlay in the multicomponent membrane will not provide too great a resistance to gas flow (while the coating still provides sufficient resistance in the pores), in order that the porous separation membrane substantially effects the separation of at least one pair of gases in the gaseous mixture. This might be accomplished, for example, by providing a material for the coating which exhibits high permeability constants for gases and low selectivity.

The thickness $l_1$ of the overlay, as represented by the model, can also have some affect on the flux and selectivity exhibited by the multicomponent membrane, since the resistance ($R_1$) of the overlay 1 is a function of its thickness $l_1$.

If a suitable material X and a material Y have been chosen, various configurations of multicomponent membranes comprising these materials can be modeled, using Equations 1, 2, and 4. Information concerning, for example, more desirable ratios of total pore cross-sectional area ($A_3$) to total surface area ($A_2+A_3$) for the porous separation membrane and more desirable thicknesses for the separating layer $l_2$ of the porous separation membrane can result from this mathematical modeling. This information may be useful, for example, in determining procedures for the production of the porous separation membranes having desirable area ratios, $A_3/(A_2+A_3)$, and desirable separating thicknesses $l_2$ as well as desirable overlay thicknesses $l_1$. In the case of anisotropic hollow fiber porous separation membranes, this might be accomplished by appropriate choice of spinning conditions and/or post-treatment conditions.

The above discussion is illustrative of the way in which various configurations of multicomponent membranes can be mathematically modeled. Several methods have been discussed for varying, with respect to at least one pair of gases, the relative resistances of the overlay 1, the solid portions 2 and the pores 3 of the porous separation membrane to provide advantageous multicomponent membranes exhibiting high flux and high selectivity for at least one pair of gases.

The following is the mathematical derivation which, in combination with Equations 3 and 4, will yeild Equation 1.

Figure 5:
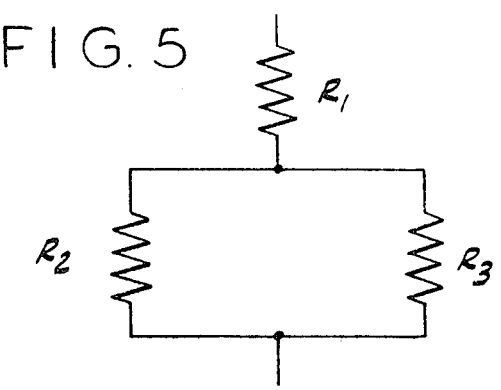

From the well-known Ohm's law of electrical resistances a mathematical expression for the total resistance, $R_T$, of the electrical circuit illustrated in FIG. 5 can be obtained.

$$R_T = R_1 + R_{23} = R_1 + \frac{R_2 R_3}{R_2 + R_3} \tag{5}$$

where $R_{23}$ is the combined resistance of $R_2$ and $R_3$ in parallel and is equal to the last term in Equation 5.

Figure 1:
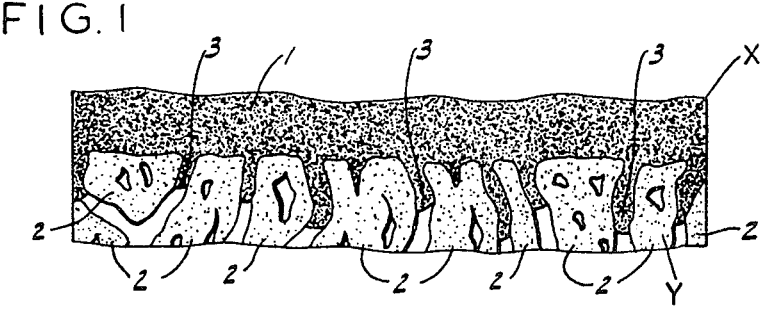
Figure 2:
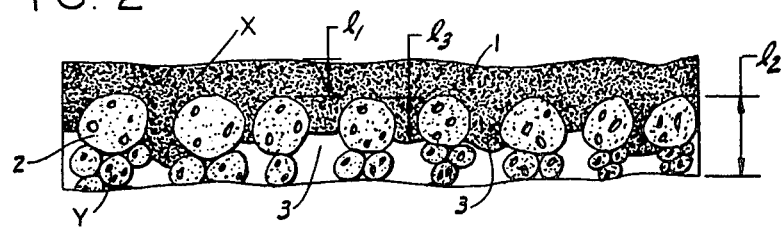
FIG. 2 is an enlarged illustration of another depicted model, wherein material Y of the porous separation membrane is in the form of curved surface interface areas either being void or partially filled with material X of the coating in a uniform contact, i.e., uninterrupted, fashion.
Figure 3:
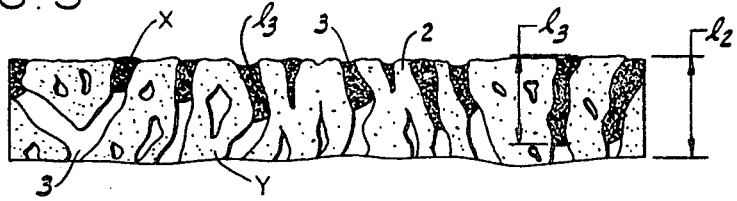
FIG. 3 is an enlarged illustration of a depicted model having material X within pores 3, but no uninterrupted overlay 1 is present.

By analogy, the mathematical model described above utilizes this same mathematical equation to express the total resistance to flow of a given gas for a multicomponent membrane, as illustrated in an exaggerated way by the depicted model of FIG. 4. The resistance, $R_{23}$, represents the combined resistance of both portions of the porous separation membrane, the solid portions 2 and the pores 3 filled with material X. If the coating is not provided as an essentially continuous overlay 1, but only as material X which enters the pores 3, a situation illustrated in the depicted model of FIG. 3, then the resistance of the overlay $R_1$ is zero, and the term is dropped from Equation 5 and all subsequent equations derived from Equation 5.

The total flux of a given gas a through the multicomponent membrane is equivalent to the current in electrical flow and, at steady state, is given by Equation 6.

$$Q_{T,a} = Q_{1,a} = Q_{23,a} \tag{6}$$

where $Q_{1,a}$ is the flux of gas a through the overlay 1, and $Q_{23,a}$ is the combined flux of gas a through both the solid portions 2 and pores 3 (filled with material X) of the porous separation membrane.

$$Q_{23,a} = Q_{2,a} + Q_{3,a} \tag{7}$$

The total partial pressure drop for gas a across the multicomponent membrane is the sum of the partial pressure drop across the overlay 1, $\Delta p_{1,a}$, and the partial pressure drop across the solid portions 2 and the filled pores 3 of the porous separation membrane, $\Delta p_{23,a}$.

$$\Delta p_{T,a} = \Delta p_{1,a} + \Delta p_{23,a} \tag{8}$$

The flux of gas a through each portion of the multicomponent membrane can be expressed by Equation 3, using the resistances and partial pressure drops specific to each portion.

$$Q_{1,a} = \frac{\Delta p_{1,a}}{R_{1,a}} \tag{9}$$

$$Q_{23,a} = \frac{\Delta p_{23,a}}{R_{23,a}} = \frac{\Delta p_{23,a}(R_{2,a} + R_{3,a})}{R_{2,a} R_{3,a}} \tag{10}$$

From Equations 6, 8, 9, and 10, an expression for $\Delta p_{23,a}$ in terms of resistances and total partial pressure drop can be derived.

$$\Delta p_{23,a} = \Delta p_{T,a} \left[ 1 + \frac{R_{1,a}(R_{2,a} + R_{3,a})}{R_{2,a} R_{3,a}} \right]^{-1} \tag{11}$$

Equation 11, in combination with Equations 6 and 10, yield Equation 1.

In accordance with this invention a coating is in occluding contact with the porous separation membrane to provide a multicomponent membrane. This mathematical model, which has been developed to explain the phenomena exhibited by the multicomponent membranes of this invention, provides that pores 3 in the porous separation membrane contain material X. The resistance to gas flow, $R_3$, of the pores containing material X is much greater than the resistance to gas flow of pores not filled with material X, since the permeability for gases of any material is much less than the permeability of an open flow channel. Accordingly, $R_3$ is increased in the multicomponent membrane, and with reference to Equation 10, $R_2$ becomes more significant in affecting $R_{23}$. Since $R_3$ is increased relative to $R_2$ in the multicomponent membrane, an increased proportion of gas passes through the solid portions of the porous separation membrane as compared to that through pores 3 filled with material X than that proportion in the porous separation membrane alone. Consequently, the separation factor of at least one gas pair is enhanced in the multicomponent membrane by interaction with the material Y, as compared to that separation factor in the porous separation membrane alone.

The following examples are illustrative of the invention but are not in limitation thereof. All parts and percentages of gases are by volume, and all parts and percentages of liquids and solids are by weight, unless otherwise indicated.

EXAMPLES 1-3

Examples 1 through 3 in Table I represent multicomponent membranes comprised of cellulose acetate porous separation membranes and a coating. Examples 2 and 3 show the same composite hollow fiber membranes separating two different gas mixtures. It is seen in these two examples that the porous substrate membrane separates both gas mixtures to some degree even in the absence of a coating, but in both cases the separation factor is much less than the determined intrinsic separation factor of the cellulose acetate. In such porous separation membranes most of the gas passes through the pores and relatively little permeate flow is through the cellulose acetate.

After coating, the separation factor for the gases exhibited by the multicomponent membranes of Examples 2 and 3 is greater than either the determined intrinsic separation factor of the coating material or the separation factor of the porous separation membrane. Thus, in the multicomponent membrane a greater proportion of the gas flow is through the cellulose acetate as compared to that through the pores; hence, the separation factor of the multicomponent membrane is much closer to the determined intrinsic separation factor of the cellulose acetate.

Example 1 shows a different sample of cellulose acetate hollow fiber with somewhat different coated and uncoated properties and can be compared to Example 2. Although the porous separation membrane has a higher permeability for $O_2$ and a lower separation factor, the multicomponent membrane exhibits a higher separation factor than each of the material of the coating and the porous separation membrane separately.

TABLE I

Permeability[a] of oxygen from air and hydrogen from carbon monoxide/hydrogen mixtures through multicomponent membranes utilizing cellulose acetate[b] porous separation membranes.

| Example No. | 1 | 2 | 3 |
|---|---|---|---|
| Coating[c] | Poly(dimethylsiloxane), Dow Corning 200, viscosity = 100 cps | Poly(dimethylsiloxane), Dow Corning 200, viscosity = 100 cps | Poly(dimethylsiloxane), Dow Corning 200, viscosity = 100 cps |
| Coating Procedure[d] | A | B | B |
| Gas Feed | Air | Air | $CO/H_2$ |
| Enriched Gas (permeate) | $O_2$ | $O_2$ | $H_2$ |
| Coating Material Determined Intrinsic Separation Factor[e] ($O_2$ over $N_2$ or $H_2$ over CO) | 2.33 | 2.33 | 1.9 |
| Porous Separation Membrane Permeability[a] ($O_2$ or $H_2$) | $5.9 \times 10^{-6}$ | $4.4 \times 10^{-6}$ | $2.7 \times 10^{-5}$ |
| Porous Separation Membrane Separation Factor[e] ($O_2$ over $N_2$ or $H_2$ over CO) | 2.2 | 1.6 | 9.2 |
| Multicomponent Membrane Separation Factor[e] ($O_2$ over $N_2$ or $H_2$ over CO) | 4.09 | 5.03 | 22.0 |
| Multicomponent Membrane Permeability[a] ($O_2$ or $H_2$) | $2.2 \times 10^{-6}$ | $1.6 \times 10^{-6}$ | $1.5 \times 10^{-5}$ |
| Cellulose Acetate Determined Intrinsic Separation Factor[e] ($O_2$ over $N_2$ or $H_2$ over CO) | 5.9 | 5.9 | ~50 |

[a] The permeability of the membrane to a given gas is the amount of gas (expressed in cubic centimeters under normal temperature and pressure conditions) which has passed through the said membrane, per square centimeter of surface area, per second, for a partial pressure drop of 1 cm of mercury between the upstream and downstream side of the membrane per unit of thickness. (Units of Permeability = $cm^3/cm^2$-sec-cm Hg).
[b] Celluose acetate (degree of substitution about 2.5) obtained from Eastman Kodak and spun in accordance with OSW Final Report #14-30-3066, "Development of High Flux Hollow Reverse Osmosis For Brackish Water Softening (1973)." The fiber of Example 2 is post treated in warm water.
[c] All coatings are liquids when applied and are not further cured, polymerized, or cross-linked after coating.
[d] The key to the coating procedure methods is listed (Table XVI) following the examples.
[e] The separation factor of a membrane for a pair of gases is defined as the permeability of the membrane for a first gas divided by the permeability for a second gas of the pair.

EXAMPLES 4-10

Examples 4 through 10 illustrate various liquid coatings on porous polysulfone hollow fiber separation membranes for selectively separating oxygen from air and are presented in Table II. The porous separation membranes do not separate oxygen from nitrogen. The coating materials used are representative of high molecular weight organic and silicone liquids which have sufficiently low vapor pressures that they will not readily evaporate from the coated surface and have separation factors for oxygen over nitrogen which are generally less than about 2.5. The molecular sizes of the coatings are sufficiently small to provide occluding contact with the porous separation membrane but are not unduly small such that the coating material can pass through the pores under coating and/or separating conditions. The observed separation factors for the multicomponent membranes are greater than each of the separation factor of the porous separation membrane (1.0 in all Examples) and the coating material (2.5 or less for the coating materials of the Examples).

TABLE II

Permeabilities[a] of $O_2$ from air feed through multicomponent membrane utilizing polysulfone[b] porous separation membranes and liquid coatings.

| Example No. | 4 | 5 | 6 | 7 | 8 | 9 | 10 |
|---|---|---|---|---|---|---|---|
| Coating[c,f] | Poly (trifluoropropyl methylsiloxane) | Hexadecane | Dow Corning Poly(phenylmethyl siloxane) | Dow Corning Sylgard 51, silicone rubber pre- | Squalane (isoprene prepolymer | Raw Linseed Oil | Polystyrene (degree of polymerization = |

TABLE II-continued

| | Permeabilities[a] of $O_2$ from air feed through multicomponent membrane utilizing polysulfone[b] porous separation membranes and liquid coatings. | | | | | | |
|---|---|---|---|---|---|---|---|
| Example No. | 4 | 5 | 6 | 7 | 8 | 9 | 10 |
| Coating Procedure[d] | A | A | A | polymer C | A | A | B (2.9) |
| Porous Separation Membrane Permeability[a] (Air) | $1.8 \times 10^{-4}$ | $2.5 \times 10^{-4}$ | $7.4 \times 10^{-4}$ | $1.8 \times 10^{-4}$ | $9.2 \times 10^{-4}$ | $2.3 \times 10^{-4}$ | $9.5 \times 10^{-4}$ |
| Porous Separation Membrane Separation Factor[e,g] ($O_2/N_2$) | 1.0 | 1.0 | 1.0 | 1.0 | 1.0 | 1.0 | 1.0 |
| Multicomponent Membrane Separation Factor[e] ($O_2/N_2$) | 4.1 | 4.0 | 4.4 | 4.0 | 4.1 | 4.5 | 4.8 |
| Multicomponent Membrane Permeability[a] ($O_2$) | $9.4 \times 10^{-6}$ | $6.5 \times 10^{-6}$ | $6.5 \times 10^{-6}$ | $1.0 \times 10^{-5}$ | $6.1 \times 10^{-6}$ | $7.0 \times 10^{-6}$ | $2.5 \times 10^{-6}$ |

[a] As in Table I.
[b] Polysulfone, Union Carbide, P-3500, and unless otherwise indicated, the polysulfone in following Examples is P-3500.
[c] All coatings are liquids when applied and are not further cured, polymerized or cross-linked after coating.
[d] As in Table I.
[e] As in Table I.
[f] Measurement of separation factors through liquids is difficult but it is believed that the determined intrinsic separation factors of the casting materials is below about 2.5 for $O_2/N_2$. In Example 5 the liquid coating separation factor was measured as about 2. In all other examples, similar materials, when polymerized or as liquids, are reported in the literature to have determined intrinsic factors ranging from 2.0-2.4.
[g] The determined intrinsic separation factor for $O_2/N_2$ for polysulfone is about 6.0 as measured from compact non-porous films.

EXAMPLES 11-15

Examples 11 through 15 illustrate various coatings which are either applied to the porous separation membranes as liquids and reacted in place to become solid polymer coatings (post-vulcanized) or are applied as normally solid polymers dissolved in a solvent. The results are reported in Table III. In the Examples oxygen is enriched from an air feed by the multicomponent membrane, and a variety of treated polysulfone hollow fiber porous separation membranes is utilized.

but numerous experiments with similar porous separation membranes indicate that the separation factors can be expected to be between about 1.3 and about 2.5. This expectation is verified in Example 17, where the porous separation membrane separation factor for $H_2$ over CO was measured as 1.3. These porous separation membranes thus exhibit some separation between $H_2$ and CO due to Knudsen diffusion. These examples illustrate the use of different coatings, coating procedure, permeabilities and separation factors of the multicomponent and porous separation membranes in providing the mul-

TABLE III

| | Permeabilities[a] of $O_2$ from air feed, through multicomponent membranes utilizing polysulfone[b] porous separation membranes and polymerized coatings. | | | | |
|---|---|---|---|---|---|
| Example No. | 11 | 12 | 13 | 14 | 15 |
| Coating | Dow Corning Sylgard 184, post-vulcanized silicone rubber | Dow Corning Sylgard 185, post-vulcanized silicone rubber | Poly(cis-1, 4-isoprene) | Dow Corning Sylgard 184, post-vulcanized silicone rubber | Dow Corning Sylgard 184, post-vulcanized silicone rubber |
| Coating Procedure[c] | E | E | D | F | F |
| Coating Material Determined Intrinsic Separation Factor[d] | 2.3 | 2.3 | 2.5-2.7 | 2.3 | 2.3 |
| Porous Separation Membrane Permeability[a] (Air) | $1.8 \times 10^{-4}$ | $1.8 \times 10^{-4}$ | $6.2 \times 10^{-4}$ | $2.1 \times 10^{-4}$ | $1.2 \times 10^{-5}$ |
| Porous Separation Membrane Separation Factor[d,e] ($O_2$ over $N_2$) | 1.0 | 1.0 | 1.0 | 1.0 | about 1 |
| Multicomponent Membrane Separation Factor[d] ($O_2$ over $N_2$) | 4.8 | 3.4 | 4.6 | 5.9 | 5.4 |
| Multicomponent Membrane Permeability[a] ($O_2$) | $1.2 \times 10^{-5}$ | $1.4 \times 10^{-5}$ | $5.8 \times 10^{-6}$ | $8.9 \times 10^{-6}$ | $9.7 \times 10^{-6}$ |

[a] As in Table I
[b] As in Table II
[c] As footnote d in Table I
[d] As footnote e in Table I
[e] As footnote g in Table II

EXAMPLES 16-18

Examples 16, 17 and 18 show that the multicomponent membranes utilizing polysulfone hollow fiber porous separation membranes can also effectively separate $H_2$ from $CO/H_2$ mixtures according to the invention. The porous separation membrane separation factor was not measured prior to coating for Examples 16 and 18, ticomponent membranes of the invention. Examples 14 and 17 and Examples 15 and 18 are carried out with the same multicomponent membrane and comparison of these examples shows that use of a multicomponent membrane for one separation or with one mixture of gases will not prevent it from later functioning with another set of gases. The Examples are reported in Table IV.

TABLE IV

Permeabilities[a] of $H_2$ from $CO/H_2$ mixtures through multicomponent membranes utilizing polysulfone[b] porous separation membranes.

| Example No. | 16 | 17 | 18 |
|---|---|---|---|
| Coating | poly(cis-1,4- isoprene) | Dow Corning Sylgard 184 post-vulcanized silicone rubber | Dow Corning Sylgard 184 post-vulcanized silicone rubber |
| Coating Procedure[c] | D | F | F |
| Coating Material Determined Intrinsic Separation Factor[d] ($H_2/CO$) | 3.5 | 1.9 | 1.9 |
| Porous Separation Membrane Permeability[a] ($H_2$) | — | $9 \times 10^{-5}$ | — |
| Multicomponent Membrane Separation Factor[d,e] ($H_2/CO$) | 15.4 | 30.2 | 31 |
| Multicomponent Membrane Permeability[a] ($H_2$) | $3.4 \times 10^{-5}$ | $5.9 \times 10^{-5}$ | $6.0 \times 10^{-5}$ |

[a] As in Table I.
[b] As in Table II.
[c] As footnote d in Table I.
[d] As footnote e in Table I.
[e] Polysulfone has a determined intrinsic separation factor of about 40 for $H_2$ over CO, when measured as a continuous compact film.

EXAMPLES 19-21

Examples 19, 20, and 21 (Table V) show permeation properties of multicomponent membranes composed of various coating materials on porous hollow fiber copoly(styrene-acrylonitrile) separation membranes for air and $CO/H_2$ separation. In each example, the multicomponent membrane has a higher separation factor than each of the coating and the porous separation membrane alone. Example 21 demonstrates a porous separation membrane which exhibits a separation factor for $H_2$ over CO of 15 before applying the coating, i.e., there are relatively few pores in the porous separation membrane and the average pore diameter may be small. A comparison of Examples 20 and 21 shows that the multicomponent membrane of Example 20 has a higher permeation rate and a higher separation factor than the porous separation membrane of Example 21, even though that membrane has a greater separation factor than that of the porous separation membrane of Example 20. Thus multicomponent membranes in accordance with the invention can have a superior rate of permeation than a membrane of equal or greater separation factor consisting essentially of the material of the porous separation membrane.

TABLE V

Permeability[a] of $H_2$ from $CO/H_2$ mixtures and $O_2$ from air through multicomponent membranes employing copoly(styrene-acrylonitrile) porous separation membranes[e]

| Example No. | 19 | 20 | 21 |
|---|---|---|---|
| Coating | Dow Corning Sylgard 184 post-vulcanized silicone rubber | Poly(dimethyl siloxane) Dow Corning 200-viscosity = 100 cps | Poly(dimethyl siloxane), Dow Corning 200-viscosity = 100 cps |
| Coating Procedure[b] | F | B | B |
| Gas Feed | Air | $H_2/CO$ | $H_2/CO$ |
| Enriched Gas (Permeate) | $O_2$ | $H_2$ | $H_2$ |
| Coating Material Determined Intrinsic Separation Factor[c] ($O_2/N_2$ or $H_2/CO$) | 2.3 | 1.9 | 1.9 |
| Porous Separation Membrane Permeability[a] (Air or $H_2$) | $6.5 \times 10^{-6}$ | $6.5 \times 10^{-5}$ | $5.6 \times 10^{-6}$ |
| Porous Separation Membrane Separation Factor[c] ($O_2/N_2$ or $H_2/CO$) | 1.0 | 3.9 | 15. |
| Multicomponent Membrane Separation Factor[c] ($O_2/N_2$ or $H_2/CO$) | 3.8 | 25 | 45 |
| Multicomponent Membrane Permeability[a] ($O_2$ or $H_2$) | $3.4 \times 10^{-6}$ | $6.2 \times 10^{-6}$ | $2.3 \times 10^{-6}$ |
| Determined Intrinsic Separation Factor[d] of Material of Porous Separation Membrane | 7.0 | 80. | 80. |

[a] As in Table I.
[b] As footnote d in Table I.
[c] As footnote e in Table I.
[d] The determined intrinsic separation factor of the substrate is the separation factor exhibited by a continuous compact film composed of the material.
[e] 33% acrylonitrile-67% styrene copolymers, Ex. 20 and 21 of higher molecular weight than Ext. 19, all spun in hollow fiber form from a 27.5% solids dope in dimethylformamide into a water coagulant at 0–10° C.

EXAMPLE 22

A five component gas stream is utilized as the feed to a multicomponent membrane of Examples 15 and 18. The feed stream is comprised of hydrogen, carbon dioxide, carbon monoxide, nitrogen, and methane with amounts of water and methanol up to saturation values. The feed stream, at 4.5 kg/cm² pressure and at a temperature of 40° C., is introduced to the shell side of the multicomponent membrane. The bore pressure is one atmosphere. The following gas permeabilities and separation factors relative to hydrogen are observed:

| Permeability* For: | Separation Factor $H_2$ over |
|---|---|
| $H_2 (8.5 \times 10^{-5})$ | — |

-continued

| Permeability* For: | Separation Factor $H_2$ over |
|---|---|
| $CO_2(3.7 \times 10^{-5})$ | $CO_2$ 2.3 |
| $CO (.27 \times 10^{-5})$ | CO 31.0 |
| $N_2 (.68 \times 10^{-5})$ | $N_2$ 12.4 |
| $CH_4(.23 \times 10^{-5})$ | $CH_4$ 36.9 |

*in $cm^3(STP)/cm^2$-sec-cm Hg.

It is clear in this example that the separation of hydrogen from gaseous mixtures containing at least one of CO, $N_2$ and $CH_4$ can be easily effected. The presence of one or more additional gases in the gaseous mixture, such as saturated water and methanol vapor, apparently does not hinder the multicomponent membrane from effecting the separation. Also it is clear that various of the other gases in the mixture can be separated from each other, e.g., the separation factor for $CO_2$ over CO would be the ratios of permeabilities, i.e., about 14. Example 22 also illustrates the effect of the the porous separation membrane in providing the relative permeation rates through the multicomponent membrane. Thus, the coating material (Sylgard 184) exhibits a determined intrinsic separation factor of about 0.3 to 0.4 for $H_2$ over $CO_2$ (i.e., $CO_2$ is faster than $H_2$), yet the multicomponent membrane exhibits a separation factor of 2.3 for $H_2$ over $CO_2$. The value is essentially equal, within experimental error, to the determined intrinsic separation factor of the polysulfone for $H_2$ over $CO_2$.

EXAMPLE 23

Example 23 (Table VI) shows the permeabilities (P/l) for a number of gases through a multicomponent membrane utilizing a hollow fiber polysulfone porous separation membrane. Example 23 shows the same values for the same gases through a continuous compact film of the polysulfone material. The ratio of any two P or P/l values defines an approximate separation factor for those gases through the compact film or the multicomponent membrane, respectively. The Example illustrates a clear trend in that the permeabilities for the multicomponent membrane generally vary from gas to gas in the same order as those for the polysulfone compact film. This trend indicates that the material of the porous separation membrane is providing a significant portion of the separation exhibited by the multicomponent membrane. This example also shows that a multicomponent membrane may be used to separate any of a number of gases from each other. For example, from the table it is seen that $NH_3$ could be readily separated from $H_2$ or $N_2$, He from $CH_4$, $N_2O$ from $N_2$, $O_2$ from $N_2$, or $H_2S$ from $CH_4$, using this multicomponent membrane. The advantage of high permeation rates of the multicomponent membranes is indicated by the data represented in Table VI.

TABLE VI

Permeabilities[a] of fixed gases through a multicomponent membrane utilizing polysulfone porous separation membrane[b] and compact polysulfone[c] film.

Example 23

| Gas | Multicomponent Membrane[b] P/l($\times 10^6$)[a] | Polysulfone[c] Continuous Compact Film P ($\times 10^{11}$)[a] |
|---|---|---|
| $NH_3$ | 210 | 530 |
| $H_2$ | 55 | 130* |
| He | 55 | 50 |
| $N_2O$ | 45 | 82 |
| $CO_2$ | 38 | 69 |
| $H_2S$ | 31 | 31 |

TABLE VI-continued

Permeabilities[a] of fixed gases through a multicomponent membrane utilizing polysulfone porous separation membrane[b] and compact polysulfone[c] film.

Example 23

| Gas | Multicomponent Membrane[b] P/l($\times 10^6$)[a] | Polysulfone[c] Continuous Compact Film P ($\times 10^{11}$)[a] |
|---|---|---|
| $O_2$ | 8.3 | 11 |
| Ar | 3.3 | 4.5 |
| $CH_4$ | 2.3 | 2.5 |
| CO | 2.4 | 3.2 |
| $N_2$ | 1.4 | 1.8 |
| $C_2H_4$ | 1.7 | 2.2 |

[a]Permeabilities for the multicomponent membrane are P/l values and have units described in footnote a in Table I. Permeabilities for the polysulfone film are P values, since the l or thickness of the compact film is easily measured. The units of P are cc(STP)-cm/$cm^2$-sec cmHg.
[b]The multicomponent membrane in this example is comprised of a Dow Sylgard 184 post-vulcanized silicone rubber coated on a porous polysulfone separation membrane such as in Example 15 using coating procedure F in Table XVI.
[c]As footnote b in Table II.
*A different compact film employed for determination of $H_2$ permeability than that used for the determination of the permeabilities of the other gases

COMPARATIVE EXAMPLES 24 through 26 (not in accordance with the invention)

Examples 24 through 26 are reported in Table VII and illustrate that not all composite membranes will fall within the scope of the invention, i.e., provide a multicomponent membrane exhibiting a separation factor significantly greater than the determined intrinsic separation factor of the coating material, even though they are comprised of porous separation membranes and coating materials each of which may be employed with other coating materials or porous separation membranes to provide multicomponent membranes in accordance with this invention.

Example 24 provides a multicomponent membrane having a pre-vulcanized silicone rubber coating on a porous polysulfone separation membrane. Since the pre-vulcanized silicone rubber may have too large molecular dimensions to be expected to occlude the pores in accordance with the model, e.g., the molecules can only bridge the pores, the coating will not alter the resistance of the pores to gas flow. In Example 24, the coating compound is a pre-vulcanized polymer with the same essential polymeric backbone as the Sylgard 184 illustrated, for instance, in Examples 11, 14 and 15 in Table III. However, the pre-vulcanized silicone rubber has a much higher molecular weight and size due to pre-vulcanization than does Sylgard 184, and thus apparently cannot fill the pores, and consequently the composite membrane exhibits a separation factor equal (within experimental error) to that of the coating material.

Example 25 illustrates a multicomponent membrane wherein Sylgard 184 is used as the coating material and a porous polyacrylonitrile separation membrane is utilized. Polyacrylonitrile exhibits a very low permeability for gases when in continuous, non-porous form. With reference to the model, such a porous separation membrane will have a very high resistance to flow through the solid portions thereof, such that when a coating material of high permeability such as Sylgard 184 is in occluding contact therewith, the gas flow occurs predominantly through the coating and the plugged pores, and thus the multicomponent membrane exhibits a separation factor which is equal to or less than that of the coating membrane.

A multicomponent membrane which is illustrated in Example 26 exhibits a separation factor that is lower than the determined intrinsic separation factor of the coating material. This situation is similar to that of Example 24 in that the poly(vinylbutyral) used as the coating material has a high molecular weight. In addition, it does not wet polysulfone as well as many silicones and other preferred coatings. Moreover, the poly(vinylbutyral) has a relatively low permeability. The observation that the separation factor exhibited by the multicomponent membrane is less than that expected of the coating material suggests imperfections in the coating itself.

TABLE VII
(not in accordance with the invention)

EXAMPLE 24

| | |
|---|---|
| Coating | General Electric 4164 Pre-vulcanized Silicone Rubber |
| Porous Hollow Fiber Membrane | Polysulfone P-3500 Union Carbide |
| Gas Feed | Air |
| Enriched Gas (Permeate) | $O_2$ |
| Coating Procedure[a] | E |
| Coating Material Determined Intrinsic Separation Factor[b] | $O_2$ over $N_2$    1.7 |
| Porous Separation Membrane Permeability[c] | For Air    $1.8 \times 10^{-4}$ |
| Porous Separation Membrane Separation Factor[b] | $O_2$ over $N_2$    1.0 |
| Multicomponent Membrane Separation Factor[b] | $O_2$ over $N_2$    1.61 |
| Multicomponent Membrane Permeability[c] | For $O_2$    $4.1 \times 10^{-5}$ |

EXAMPLE 25

| | |
|---|---|
| Coating | Dow Corning Sylgard 184 post-vulcanized Silicone Rubber |
| Porous Hollow Fiber Membrane | Polyacrylonitrile |
| Gas Feed | Air |
| Enriched Gas (Permeate) | $O_2$ |
| Coating Procedure[a] | F |
| Coating Material Determined Intrinsic Separation Factor[b] | $O_2$ over $N_2$    2.3 |
| Porous Separation Membrane Permeability[c] | For Air    $2 \times 10^{-3}$ |
| Porous Separation Membrane Separation Factor[b] | $O_2$ over $N_2$    1.0 |
| Multicomponent Membrane Separation Factor[b] | $O_2$ over $N_2$    1.9 |
| Multicomponent Membrane Permeability[c] | For $O_2$    $1.7 \times 10^{-5}$ |

EXAMPLE 26

| | |
|---|---|
| Coating | Poly-(vinylbutyral) |
| Porous Hollow Fiber Membrane | Polysulfone P-3500 Union Carbide |
| Gas Feed | Air |
| Enriched Gas (Permeate) | $O_2$ |
| Coating Procedure[a] | C |
| Coating Material Determined Intrinsic Separation Factor[b] | $O_2$ over $N_2$    4.7 |
| Porous Separation Membrane Permeability[c] | For Air    $1.8 \times 10^{-4}$ |
| Porous Separation Membrane Separation Factor[b] | $O_2$ over $N_2$    1.0 |
| Multicomponent Membrane Separation Factor[b] | $O_2$ over $N_2$    4.0 |
| Multicomponent Membrane Permeability[c] | For $O_2$    $1.4 \times 10^{-6}$ |

[a]As footnote d in Table I.
[b]As footnote e in Table I.
[c]As footnote a in Table I.

EXAMPLES 27–34

Examples 27 through 34 are reported in Table VIII and illustrate a series of porous separation membrane post-spinning treatments and the way in which these treatments affect the separation properties of multicomponent membranes made from such post-treated porous separation membranes. In Table VIII the coating material and the method of application are essentially the same in order to emphasize that changes in the permeation rate and separation factor of the multicomponent membranes (for both air and $CO/H_2$ gas mixture feed) are apparently due to changes in the relatively dense regions of the porous separation membrane. The treatments are believed to affect the available pore cross-sectional area ($A_3$) relative to total surface area ($A_2 + A_3$) of porous separation membrane. A decrease in $A_3$ relative to the total surface area will cause an increase in the relative resistance to flow through the pores in the porous separation and multicomponent membranes. This, in turn, will force more of the permeate gas to flow through the porous separation membrane material, and the separation factor exhibited by the multicomponent membrane will move closer to the intrinsic separation factor of the material of the porous separation membrane.

In all of the examples in Table VIII, the porous separation membrane utilized is a porous hollow fiber membrane of polysulfone (Union Carbide, P-3500) from the same bobbin, which was wet-spun from a dope of 25% solids in dimethylformamide solvent into a coagulant of water at approximately 3° C. through a tube-in-orifice jet through which water was injected to the bore and the fiber taken up at a speed of 21.4 mpm. The porous separation membrane used in each example is stored in deionized water at room temperature after spinning until the post-treatment process is applied.

TABLE VIII
Examples 27 through 34
Hollow Fiber Membrane Post Treatment

The multicomponent membranes of Examples 27 through 34 utilize a coating of Dow Corning Sylgard 184 post-vulcanized silicone rubber following coating procedure F as in Table XVI. Post treatment was performed on the hollow fiber membrane after spinning but before the coating was applied.

EXAMPLE 27

| | | |
|---|---|---|
| Post Treatment | Air evaporation of the water | |
| Gas Feed | Air | |
| Enriched Gas (Permeate) | $O_2$ | |
| Multicomponent Membrane Permeability[a] | For $O_2$ | $1.5 \times 10^{-5}$ |
| Multicomponent Membrane Separation Factor[b] | $O_2$ over $N_2$ | 4.7 |
| Post-treated Porous Separation Membrane Permeability[a] | For air | $3.7 \times 10^{-4}$ |
| Post-treated Porous Separation Membrane Separation Factor[b] | $O_2$ over $N_2$ | 1.0 |

EXAMPLE 28

| | |
|---|---|
| Post Treatment | Air evaporation of the water |
| Gas Feed | CO, $H_2$ |

TABLE VIII-continued
Examples 27 through 34
Hollow Fiber Membrane Post Treatment The multicomponent membranes of Examples 27 through 34 utilize a coating of Dow Corning Sylgard 184 post-vulcanized silicone rubber following coating procedure F as in Table XVI. Post treatment was performed on the hollow fiber membrane after spinning but before the coating was applied.

| | | |
|---|---|---|
| Enriched Gas (Permeate) | $H_2$ | |
| Multicomponent Membrane Permeability[a] | For $H_2$ | $7.6 \times 10^{-5}$ |
| Multicomponent Membrane Separation Factor[b] | $H_2$ over CO | 23.1 |
| Post-treated Porous Separation Membrane Permeability[a] | For $H_2$ | $\sim 2.0 \times 10^{-4}$ |
| Post-treated Porous Separation Membrane Separation Factor[b] | $H_2$ over CO | $\sim 2.6$ |

EXAMPLE 29

| | |
|---|---|
| Post Treatment | Air evaporation of the water; followed by exposure to acetone vapor at 25° C. with bore vacuum; followed by alternating water immersion and methanol immersion with bore vacuum (3 cycles); followed by alternating water immersion and isopropyl alcohol immersion (2 cycles). |
| Gas Feed | Air |
| Enriched Gas (Permeate) | $O_2$ |
| Multicomponent Membrane Permeability[a] | For $O_2$ — $7.7 \times 10^{-6}$ |
| Multicomponent Membrane Separation Factor[b] | $O_2$ over $N_2$ — 5.3 |
| Post-treated Porous Separation Membrane Permeability[a] | For $O_2$ — $3.5 \times 10^{-5}$ |
| Post-treated Porous Separation Membrane Separation Factor[b] | $O_2$ over $N_2$ — 1.0 |

EXAMPLE 30

| | |
|---|---|
| Post Treatment | Air evaporation of the water; followed by exposure to acetone vapor at 25° C. with bore vacuum; followed by alternating water immersion and methanol immersion with bore vacuum (3 cycles); followed by alternating water immersion and isopropyl alcohol immersion (2 cycles). |
| Gas Feed | CO, $H_2$ |
| Enriched Gas (Permeate) | $H_2$ |
| Multicomponent Membrane Permeability[a] | For $H_2$ — $4.5 \times 10^{-5}$ |
| Multicomponent Membrane[b] Separation Factor | $H_2$ over CO — 30.4 |
| Post-treated Porous Separation Membrane Permeability[a] | For $H_2$ — $1.5 \times 10^{-4}$ |
| Post-treated Porous Separation Membrane Separation Factor[b] | $H_2$ over CO — 5.1 |

EXAMPLE 31

| | |
|---|---|
| Post Treatment | Air evaporation of the water; followed by heating in hot air oven to 80–95° for approximately 3 hours. |
| Gas Feed | Air |
| Enriched Gas (Permeate) | $O_2$ |
| Multicomponent Membrane Permeability[a] | For $O_2$ — $1.6 \times 10^{-5}$ |
| Multicomponent Membrane Separation Factor[b] | $O_2$ over $N_2$ — 5.0 |
| Post-treated Porous Separation Membrane Permeability[a] | For air — $3.7 \times 10^{-4}$ |
| Post-treated Porous Separation Membrane Separation Factor[b] | $O_2$ over $N_2$ — 1.0 |

EXAMPLE 32

| | |
|---|---|
| Post Treatment | Air evaporation of the water; followed by heating in hot air oven to 80–95° for approximately 3 hours. |
| Gas Feed | CO, $H_2$ |
| Enriched Gas (Permeate) | $H_2$ |
| Multicomponent Membrane Permeability[a] | For $H_2$ — $9.8 \times 10^{-5}$ |
| Multicomponent Membrane Separation Factor[b] | $H_2$ over CO — 23 |
| Post-treated Porous Separation Membrane Permeability[a] | For $H_2$ — $\sim 2.5 \times 10^{-4}$ |
| Post-treated Porous Separation Membrane Separation Factor[b] | $H_2$ over CO — $\sim 1.3$ |

EXAMPLE 33

| | |
|---|---|
| Post Treatment | Dry by exchanging water with isopropyl alcohol; followed by exchanging the isopropyl alcohol with pentane; followed by air evaporation of the pentane |
| Gas Feed | Air |
| Enriched Gas (Permeate) | $O_2$ |
| Multicomponent Membrane Permeability[a] | For $O_2$ — $2.0 \times 10^{-5}$ |
| Multicomponent Membrane Separation Factor[b] | $O_2$ over $N_2$ — 4.2 |
| Post-treated Porous Separation Membrane Permeability[a] | For air — $1.5 \times 10^{-3}$ |
| Post-treated Porous Separation Membrane Separation Factor[b] | $O_2$ over $N_2$ — 1.0 |

EXAMPLE 34

| | |
|---|---|
| Post Treatment | Dry by exchanging water with isopropyl alcohol; followed by exchanging the isopropyl alcohol with pentane; followed by air evaporation of the pentane |
| Gas Feed | CO, $H_2$ |
| Enriched Gas (Permeate) | $H_2$ |
| Multicomponent Membrane Permeability[a] | For $H_2$ — $1.2 \times 10^{-4}$ |
| Multicomponent Membrane Separation Factor[b] | $H_2$ over CO — 15.9 |
| Post-treated Porous Separation Membrane Permeability[a] | For $H_2$ — $\sim 2.5 \times 10^{-4}$ |
| Post-treated Porous Separation Membrane Separation Factor[b] | $H_2$ over CO — $\sim 1.3$ |

[a] as footnote a in Table I
[b] as footnote e in Table I

EXAMPLES 35–39

Examples 35 through 39 reported in Table IX illustrate the effect which additives in the coating material have on the separation factor of a multicomponent membrane for two gas mixture feedstreams (air and CO/$H_2$). These additives are incorporated into the coating material in small amounts before the coating is applied to the porous separation membrane. Such additives can change the separating properties of the multicomponent membranes, for example, by changing the wetting properties of the coating material and thereby affecting its ability to be in occluding contact with the porous separation membrane. If the additive enhances occluding contact the separation factor of a multicomponent membrane with such an additive is expected to be closer to the intrinsic separation factor of the porous separation membrane material than the separation factor of a similar multicomponent membrane without such an additive.

The porous separation membrane hollow fibers utilized in Examples 35 to 39 were all from the same bobbin and were made of polysulfone (P-3500) in a highly porous form (see footnote a), by spinning according to the same procedure as the hollow fibers of Examples 27–34. The determined intrinsic separation factor of polysulfone for $O_2$ over $N_2$ from an air feed is about 6.0 and for $H_2$ over CO from a CO/$H_2$ mixture is about 40.

The conditions under which the porous substrate material is spun determine to a great extent the porosity characteristics and the effective separating thickness which that substrate will possess. In addition, these characteristics can be altered with post-spinning treatments of the porous substrate (see Examples 27 to 34).

TABLE X

Spinning Conditions for P-3500 Polysulfone Hollow Fiber Porous Separation Membranes

EXAMPLE 40

| | |
|---|---|
| Solvent | Dimethylformamide |
| Coagulation Temp.°C. | 3° |
| Spin Rate, mpm | 21.4 mpm |
| Dope Concentration-wt. % polymer | 25% |
| Multicomponent Membrane Separation Factor, $O_2$ over $N_2$[b] | 4.5 |
| Permeability for $O_2$[a] | $7.7 \times 10^{-6}$ |
| Multicomponent Membrane Separation Factor, $H_2$ over CO[b] | 16.7 |
| Permeability for $H_2$[a] | $5.0 \times 10^{-5}$ |
| Porous Separation Membrane | $6 \times 10^{-4}$ |

TABLE IX

Effect of additives in the coating material on the separation factor of the multicomponent membrane.[a]

| Example No. | 35 | 36 | 37 | 38[e] | 39[e] |
|---|---|---|---|---|---|
| Coating | poly(dimethyl-siloxane) Dow Corning 200 | poly(dimethyl-siloxane) Dow Corning 200 | poly(dimethyl-siloxane) Dow Corning 200 | Dow Corning RTV 3144 pre-vulcanized silicone rubber | Dow Corning RTV 3144 pre-vulcanized silicone rubber |
| Additive to coating material[b] | — | 0.2% galvinoxyl radical[d] | 0.4% phenanthene | — | 4.3% Dow Corning Sylgard 184 curing agent (silicone prepolymer) |
| Multicomponent Membrane Separation Factor[c] ($O_2$ over $N_2$) | 3.0 to 3.3 | 4.9 | 4.8 | 3.9 | 4.5 |
| Multicomponent Membrane Separation Factor[c] ($H_2$ over CO) | 3.8 | 16.5 | 10.7 | 14.6 | 20.5 |

[a]All multicomponent membranes in Examples 35–39 are composed of polysulfone (Union Carbide, 3500) separation membranes and are highly porous before applying the coating.
[b]All percentages are by weight.
[c]As footnote e in Table 1.
[d]Galvinoxyl radical obtained from Aldrich Chemical. Structure listed below.

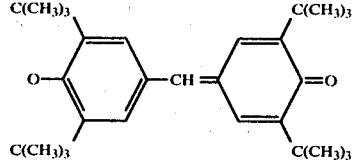

[e]Both silicone rubber compositions have determined intrinsic separation factors 2.3 for $O_2$ and $N_2$ and 1.1 for $H_2$ over CO.

EXAMPLES 40–43

Examples 40 through 43 in Table X illustrate multicomponent membranes in which the porous separation membranes are prepared under different spinning conditions. The multicomponent membranes of Examples 40 to 43 employ a Dow Corning Sylgard 184 post-vulcanized silicone rubber coating (Coating Procedure F, Table XVI) on porous polysulfone (Union Carbide, P-3500) separation membranes. The porous polysulfone hollow fiber substrate membranes are wet jet spun from the indicated dopes into a water coagulant at the indicated temperature and spinning rate by means of a hollow fiber spinnerette having an orifice to provide for injection of coagulant into the fiber bore as formed. The range of permeabilities ($O_2$ and $H_2$) and separation factors of the multicomponent membranes ($O_2$ over $N_2$ and $H_2$ over CO) exhibited in Examples 40 to 43 for either air feed or CO/$H_2$ mixture feed can be related to the variability in relative resistances of the pores and material of the porous separation membranes to gas flow.

EXAMPLE 41

| | |
|---|---|
| Solvent | Dimethylformamide |
| Coagulation Temp.°C. | 5° |
| Spin Rate, mpm | 21.4 mpm |
| Dope Concentration-wt. % polymer | 25% |
| Multicomponent Membrane Separation Factor, $O_2$ over $N_2$[b] | 5.09 |
| Permeability for $O_2$[a] | $6.2 \times 10^{-6}$ |
| Multicomponent Membrane Separation Factor, $H_2$ over CO[b] | 25 |
| Permeability for $H_2$[a] | $4.9 \times 10^{-5}$ |
| Porous Separation Membrane Permeability[a] for Air | $9 \times 10^{-4}$ |

EXAMPLE 42

| | |
|---|---|
| Solvent | Dimethylformamide |
| Coagulation Temp.°C. | 4° |
| Spin Rate, mpm | 33 mpm |
| Dope Concentration-wt. % polymer | 28% |
| Multicomponent Membrane | 5.9 |

TABLE X-continued

Spinning Conditions for P-3500 Polysulfone Hollow Fiber Porous Separation Membranes

| | |
|---|---|
| Separation Factor, $O_2$ over $N_2$[b] Permeability for $O_2$ | $8.0 \times 10^{-6}$ |
| Multicomponent Membrane Separation Factor, $H_2$ over CO[b] | 30 |
| Permeability for $H_2$[a] | $5.9 \times 10^{-5}$ |
| Porous Separation Membrane Permeability[a] for Air | $2 \times 10^{-4}$ |

EXAMPLE 43

| | |
|---|---|
| Solvent | Dimethylacetamide |
| Coagulation Temp. °C. | 5° |
| Spin Rate, mpm | 33 mpm |
| Dope Concentration-wt. % polymer | 27% |
| Multicomponent Membrane Separation Factor, $O_2$ over $N_2$[b] | 5.6 |
| Permeability for $O_2$ | $6.0 \times 10^{-6}$ |
| Multicomponent Membrane Separation Factor, $H_2$ over CO[b] | 27 |
| Permeability[a] for $H_2$ | $3.8 \times 10^{-5}$ |
| Porous Separation Membrane Permeability[a] for Air | $4.5 \times 10^{-4}$ |

[a] As in Table I
[b] As footnote e in Table I

EXAMPLES 44–51

Examples 44 through 47 in Table IX illustrate multicomponent membranes wherein the porous separation members is in the form of an anisotropic film comprising an acrylonitrile/styrene copolymer having a determined intrinsic separation factor for $H_2$ over CO of 76. The films had been cast from solvents comprising dimethylformamide and non-solvents as indicated in the Table onto a plate, desolvated in air for 5–45 seconds, coagulated as indicated below then submerged in water at 25° C. to wash, removed and dried. Examples 48 to 51 illustrate multicomponent membranes in the form of films which are dense. These examples illustrate multicomponent membranes according to the invention which are in the form of films, and may include porous separation membranes that have coatings on both surfaces.

TABLE XI

Multicomponent Membranes in Film Form

EXAMPLE 44

| | |
|---|---|
| Coating | Dow Corning Sylgard 184 post-vulcanized silicone rubber |
| Porous Separation Membrane | Copoly(acrylonitrile/styrene) 32%/68% by weight[c] |
| Gas Feed | $H_2$,CO |
| Coating Procedure[a] | B |
| Coating Material Determined Intrinsic Separation Factor[b] $H_2$ over CO | 1.9 |
| Porous Separation Membrane Separation Factor[b] $H_2$ over CO | 13 |
| Multicomponent Membrane Separation Factor[b], $H_2$ | 34.8 |

EXAMPLE 45

| | |
|---|---|
| Coating | Dow Corning 200 poly(dimethyl siloxane) |
| Porous Separation Membrane | Copoly(acrylonitrile/styrene) 32%/68% by weight[d] |
| Gas Feed | $H_2$,CO |
| Coating Procedure[a] | B |
| Coating Material Determined Intrinsic Separation Factor[b] $H_2$ over CO | 1.9 |
| Porous Separation Membrane Separation Factor[b] $H_2$ over CO | 12.2 |
| Multicomponent Membrane Separation Factor[b] $H_2$ over CO | 23.8 |

EXAMPLE 46

| | |
|---|---|
| Coating | Dow Corning Sylgard 184 vulcanized Silicone Rubber |
| Porous Separation Membrane | Copoly(acrylonitrile/styrene) 32%/68% by weight[e] |
| Gas Feed | $H_2$,CO |
| Coating Procedure[a] | B |
| Coating Material Determined Intrinsic Separator Factor[b] $H_2$ over CO | 1.9 |
| Porous Separation Membrane Separation Factor[b] $H_2$ over CO | 4.0 |
| Multicomponent Membrane Separation Factor[b] $H_2$ over CO | 23.5 |

EXAMPLE 47

| | |
|---|---|
| Coating | Dow Corning 200 poly(dimethyl siloxane) |
| Porous Separation Membrane | Copoly(acrylonitrile/styrene) 32%/68% by weight[f] |
| Coating | Dow Coating 200 poly(dimethyl siloxane) |
| Gas Feed | $H_2$,CO |
| Coating Procedure[a] | B |
| Coating Material Determined Intrinsic Separation Factor[b] $H_2$ over CO | 1.9 |
| Porous Separation Membrane Separation Factor[b] $H_2$ over CO | 3.4 |
| Multicomponent Membrane, Coating on One Side Separation Factor[b], $H_2$ over CO | 7.6 |
| Multicomponent Membrane, Coating on Both Sides Separation Factor[b], $H_2$ over CO | 34 |

EXAMPLE 48

| | | |
|---|---|---|
| Coating | Dow Corning Sylgard 184 post-vulcanized silicone rubber | |
| Porous Separation Membrane | Copoly(acrylonitrile/styrene) 25%/75% by weight | |
| Gas Feed | Air | |
| Enriched Gas (Permeate) | $O_2$ | |
| Coating Procedure[a] | E | |
| Coating Material Determined Intrinsic Separation Factor[b] | 2.3 | |
| Porous Separation Membrane Separation Factor[b] | $O_2$ over $N_2$ | 3.6 |
| Multicomponent Membrane Separation Factor[b] | $O_2$ over $N_2$ | 5.4 |

EXAMPLE 49

| | | |
|---|---|---|
| Coating | Dow Corning 200 poly(dimethyl siloxane) | |
| Porous Separation Membrane | Polyblend of two acrylonitrile/styrene copolymers | |
| Gas Feed | Air | |
| Enriched Gas (Permeate) | $O_2$ | |
| Coating Procedure[a] | A | |
| Coating Material Determined Intrinsic Separation Factor[b] | 2.3 | |
| Porous Separation Membrane Separation Factor[b] | $O_2$ over $N_2$ | 4.9 |
| Multicomponent Membrane Separation Factor[b] | $O_2$ over $N_2$ | 6.1 |

EXAMPLE 50

TABLE XI-continued

Multicomponent Membranes in Film Form

| | |
|---|---|
| Coating | Dow Corning 200 poly(dimethyl siloxane) |
| Porous Separation Membrane | Copoly(acrylonitrile/styrene) 32%/68% by weight, suspension polymerized |
| Gas Feed | Air |
| Enriched Gas (Permeate) | $O_2$ |
| Coating Procedure[a] | A |
| Coating Material Determined Intrinsic Separation Factor[b] | 2.3 |
| Porous Separation Membrane Separation Factor[b] | $O_2$ over $N_2$    1.0 |
| Multicomponent Membrane Separation Factor[b] | $O_2$ over $N_2$    6.3 |

EXAMPLE 51

| | |
|---|---|
| Coating | Dow Corning 200 poly(dimethyl siloxane) |
| Porous Separation Membrane | Copoly(acrylonitrile/styrene) 32%/68% by weight, mass polymerized |
| Gas Feed | Air |
| Enriched Gas (Permeate) | $O_2$ |
| Coating Procedure[a] | A |
| Coating Material Determined Intrinsic Separation Factor[b] | 2.3 |
| Porous Separation Membrane Separation Factor[b] | $O_2$ over $N_2$    3.6 |
| Multicomponent Membrane Separation Factor[b] | $O_2$ over $N_2$    4.9 |

[a]As explained in Table XVI
[b]As footnote e in Table I
[c]Coagulated in 50/50 by volume ethylene glycol/water for 30 min. at 25° C.
[d]Coagulated in 90/10 by volume isopropyl alcohol/water for 30 min. at 25° C.
[e]Coagulated in 10/90 by volume isopropyl alcohol/water for 30 min. at 25° C.
[f]Coagulated in water at 25° C.

EXAMPLES 52-57

Examples 52 through 57 illustrate several multicomponent membranes in hollow fiber form. The porous hollow fibers can be produced by wet-spinning as generally described above. The polycarbonate fiber of Examples 52 and 53 as wet-jet spun from a dope of 27.5 wt. percent polycarbonate in N-methylpyrrolidone into a water coagulant at 25° C. at a rate of 21.4 mpm. The polysulfone hollow fiber of Example 54 was spun from a dope of 27.5 wt. percent polysulfone (P-3500) in a mixed 80/20 dimethylacetamide/acetone solvent into a water coagulant at 2° C. at a rate of 21.4 mpm. The acrylonitrile-styrene copolymer fiber of Example 55 was spun from a dope of 27.5 wt. percent copolymer in a mixed solvent of 80/20 dimethylformamide/formamide into a water coagulant at 3° C. at a rate of 21.4 mpm. The acrylonitrile-styrene copolymer fiber of Examples 56 and 57 was spun from a dope of 25 wt. percent copolymer in the same mixed solvent as in Example 55 into a water coagulant at about 20° C. at a rate of 21.4 mpm. The results of testing the multicomponent hollow fibers in separating a hydrogen/carbon monoxide gas mixture are set out in Table XII below.

TABLE XII

| Example No. | Dow Corning Sylgard 184 post-vulcanized silicone rubber G.E. Lexan 151 Polycarbonate 52 | Dow Corning X-4258 α-methyl styrene/dimethylsiloxane block copolymer G.E. Lexan 151 Polycarbonate 53 | Dow Corning X-4258 α-methyl styrene/dimethylsiloxane block copolymer P-3500 Polysulfone 54 | Dow Corning Sylgard 184 post-vulcanized silicone rubber 33/67 Acrylonitrile/styrene copolymer Post treated in methanol, dried 55 | Dow Corning Sylgard 184 post-vulcanized silicone rubber VHAN Copolymer 44/56 Acrylonitrile/styrene Post treated in methanol, dried 56 | Dow Corning Sylgard 184 post-vulcanized silicone rubber VHAN Copolymer 44/56 Acrylonitrile/styrene No Post treatment 57 |
|---|---|---|---|---|---|---|
| Gas Feed | $H_2$,CO | $H_2$,CO | $H_2$,CO | $H_2$,CO | $H_2$,CO | $H_2$,CO |
| Coating Procedure | F | D | D | F | F | F |
| Coating Material Determined Intrinsic Separation Factor $H_2$ over CO | 1.9 | 2.1 | 2.1 | 1.9 | 1.9 | 1.9 |
| Porous Separation Membrane Separation Factor $H_2$ over CO | 3.29 | 1.3 | 3.0 | 3.0 | — | 3.2 |
| Multicomponent Membrane Separation Factor $H_2$ over CO | 7.5 | 9.4 | 15.6 | 32 | 67.5 | 17 |
| Multicomponent Membrane Permeability for $H_2$ | $4.41 \times 10^{-5}$ | $9.95 \times 10^{-5}$ | $6.7 \times 10^{-5}$ | $3.2 \times 10^{-5}$ | $1.9 \times 10^{-5}$ | $4.46 \times 10^{-5}$ |
| Porous Separation Membrane Permeability for $H_2$ | $2.58 \times 10^{-4}$ | $5.3 \times 10^{-4}$ | $4.8 \times 10^{-4}$ | $2.9 \times 10^{-4}$ | — | $3.4 \times 10^{-4}$ |
| Determined Intrinsic Separation Factor, $H_2$ over CO for Material of Porous Separation Membrane | 23.2 | 23.2 | 40 | 85 | ~100 | ~100 |

EXAMPLE 58

This example illustrates a multicomponent membrane having multiple coatings to achieve a desired separation factor. A porous hollow fiber separation membrane composed of a copolymer of 63% acrylonitrile and 37% styrene was wet-spun from a solution of 27.5 wt. percent copolymer in 93/7 dimethylformamide/formamide mixed solvent into 2° C. water at a rate of 21.4 mpm. This fiber was first treated by dipping in methanol while a vacuum was pulled on the bore, dried and the methanol treatment and drying repeated. The dried substrate fiber was then coated by procedure D with poly(cis-isoprene) in pentane solvent, cured for 30 minutes at 85° C. and then coated with 10% solution of Sylgard 184 in pentane by procedure F. The coated substrate was then recoated with the poly(cis-isoprene) solution, dried and recoated with the Sylgard 184 solution and thereafter cured 30 minutes at 90° C., 30 minutes at 100° C. and finally 30 minutes at 105° C. The results of testing the uncoated porous and the multiply coated multicomponent membrane are set out in Table XIII.

TABLE XIII

| Coating Material Determined Intrinsic Separation Factor, $H_2$ over CO | Cis-Isoprene 3.5 Sylgard 1.9 |
|---|---|
| Porous Separation Membrane Separation Factor, $H_2$ over CO | 5.09 |
| Multicomponent Membrane Separation Factor, $H_2$ over CO | 82 |
| Multicomponent Membrane Permeability to $H_2$ | $6.5 \times 10^{-7}$ |
| Porous Separation Membrane Permeability to $H_2$ | $2.65 \times 10^{-5}$ |
| Determined Intrinsic Separation Factor, $H_2$ over CO of Material of Porous Separation Membrane | 320 |

EXAMPLES 59 and 60

Examples 59 and 60 illustrate multicomponent membranes utilizing a brominated poly(xylylene oxide) porous separation membrane in hollow fiber form with a coating. The hollow fiber was wet-spun from a dope of 30 wt. percent polymer in N-methylpyrrolidone into a water coagulant at 85° C. at a rate of 14.8 mpm. In Example 59 the brominated poly(xylylene oxide) in which the bromination is essentially upon methyl groups is coated without a post-spinning treatment. In Example 60 the brominated poly(xylylene oxide) is post-treated by soaking for 20 hours in a solution of 10% trimethylamine in water. The coating in each instance was Dow Corning Sylgard 184 silicone rubber applied by procedure B (see Table XVI). The results are set out in Table XIV below.

TABLE XIV

| | 59 Dow Corning Sylgard 184 post-vulcanized silicone rubber Brominated Poly-(xylene oxide) | 60 Dow Corning Sylgard 184 post-vulcanized silicone rubber Brominated Poly-(xylene oxide) Post-treated with $(CH_3)_3N$ |
|---|---|---|
| Coating Material Determined Intrinsic Separation Factor, $H_2$ over CO | 1.9 | 1.9 |
| Porous Separation Membrane Separation Factor, $H_2$ over CO | 1.48 | 2.85 |
| Multicomponent Membrane Separation Factor $H_2$ over CO | 11.1 | 9.59 |
| Multicomponent Membrane Permeability to $H_2$ | $9.58 \times 10^{-5}$ | $1.27 \times 10^{-5}$ |
| Porous Separation Membrane Permeability to $H_2$ | $1.25 \times 10^{-3}$ | $3.83 \times 10^{-5}$ |
| Determined Intrinsic Separation Factor, $H_2$ over CO, for Material of Porous Separation Membrane | 15 | 34 |

EXAMPLE 61

This example illustrates a multicomponent membrane utilizing a different modified brominated poly(xylylene oxide) porous separation membrane in hollow fiber form. The hollow fiber of brominated poly(xylylene oxide) of Example 59 was post-treated by soaking for about 70 hours at 50° C. in a solution of 5% by weight thiourea dissolved in 95/5 by volume water/methanol. After drying, the hollow fiber membrane was coated with a 5% solution of Dow Corning Sylgard 184 in pentane by procedure F (see Table XVI). Testing of the post-treated hollow fiber porous separation membrane and of the coated multicomponent membrane gave the following results:

| Coating Material Determined Intrinsic Separation Factor, $H_2$ over CO | 1.9 |
|---|---|
| Porous Separation Membrane Separation Factor, $H_2$ over CO | 5.6 |
| Multicomponent Membrane Separation Factor, $H_2$ over CO | 46.1 |
| Multicomponent Membrane Permeability to $H_2$ | $7.2 \times 10^{-6}$ |
| Porous Separation in Membrane Permeability to $H_2$ | $3.9 \times 10^{-5}$ |
| Determined Intrinsic Separation Factor, $H_2$ over CO, for Material of Porous Separation Membrane | ~150 |

EXAMPLES 62 and 63

These examples serve to illustrate the flexibility of the invention wherein the coating may be present on the interior and both interior and exterior surfaces of a hollow fiber porous separation membrane. They also illustrate the invention in a process wherein the gaseous feed stream is contacted at the surface of the multicomponent membrane opposite the coating. In Example 62 a porous polysulfone hollow fiber separation membrane was coated on the interior with a 3% solution of Sylgard 184 post-vulcanized silicone rubber in pentane by pumping such solution slowly through the bore of the hollow fiber substrate and allowing the fiber to air dry. The permeability was determined by permeation of an $H_2$-CO mixture from the exterior into the bore of the resulting composite membrane. In Example 63 the bore coated fiber of Example 62 was additionally coated with the same Sylgard 184 solution by procedure F. The results of testing these multicomponent membranes are set out in Table XV below.

TABLE XV

| | 62 Dow Corning Sylgard 184 post-vulcanized silicone rubber Polysulfone[a] (bore only coated) | 63 Dow Corning Sylgard 184 post-vulcanized silicone rubber Polysulfone[a] (bore and outside coated) |
|---|---|---|
| Coating Material Determined Intrinsic Separation Factor, $H_2$ over CO | 2.3 | 2.3 |
| Porous Separation Membrane Separation Factor, $H_2$ over CO | 3.23 | 3.23 |
| Multicomponent Membrane Separation Factor $H_2$ over CO | 22.0 | 21.2 |
| Multicomponent Membrane Permeability to $H_2$ | $3.6 \times 10^{-5}$ | $2.31 \times 10^{-5}$ |
| Porous Separation Membrane Permeability to $H_2$ | $2.06 \times 10^{-4}$ | $2.06 \times 10^{-4}$ |

[a]Polysulfone, Union Carbide, P-3500, wet-spun from a 30 wt. percent dope in a 50/50 dimethylformamide/N-methyl pyrrolidone solvent mixture into water at 2° C. at a rate of 21.4 mpm and taken up, after washing and stretching, at 33 mpm.

EXAMPLE 64

This example illustrates a procedure for making a multicomponent membrane in hollow fiber form which utilizes a polysulfone porous separation membrane and a coating of Sylgard 184. Polysulfone polymer (P-3500 available from Union Carbide) is dried at 100° C. at 125 mm. of mercury pressure for about 25 hours. The dried polysulfone is admixed at a temperature of about 65° to 70° C. with dimethylacetamide (moisture content less than about 0.1 weight percent) to provide a solution containing 27.5 weight percent polysulfone. The solution is transported to a holding tank having a nitrogen atmosphere at about 1.4 kilograms per square centimeter. The solution is not heated while in the holding tank and thus can cool to ambient temperature.

The polymer solution is pumped from the holding tank to a hollow fiber spinnerette which is immersed in an aqueous bath at a temperature of about 4° C. The spinnerette has an outer orifice diameter of 0.0559 cm, and inner pin of 0.0229 cm and an injection orifice in the pin of 0.0127 cm. The polymer solution is pumped and metered to the spinnerette at a rate of about 7.2 milliliters per minute and is drawn from the spinnerette at a rate of about 33 meters per minute. The polymer solution coagulates in the form of a hollow fiber upon contacting the aqueous bath. Through the injection orifice of the spinnerette is provided distilled water to coagulate the inside of the hollow fiber. The fiber passes through the aqueous bath for a distance of about one meter. A quantity of the aqueous bath is continuously purged to maintain a dimethyl acetamide concentration of less than about 4 weight percent in the bath.

The fiber is then immersed in a second aqueous bath which is maintained at a temperature of about 4° C. for a distance of about five meters. Upon leaving the second aqueous bath the fiber contains some dimethylacetamide.

The fiber from the second aqueous bath is immersed in two additional aqueous baths at room temperature, each for a distance of about five meters, and the fiber is wound on a bobbin under only sufficient tension to efect the winding. The fiber is maintained wet with water during winding, and after winding the bobbin is immersed in an aqueous vat and stored at room temperature. Thereafter, the fiber is dried under ambient conditions, preferably at about 20° C. and 50 percent relative humidity. The dried fiber is then coated with a solution of about 5 percent dimethylsiloxane-containing silicone rubber prepolymer (Sylgard 184 available from Dow Corning) and a curing agent in n-pentane. The application of the coating is conducted by immersing the fiber in the prepolymer solution while maintaining the solution under a positive pressure. The fiber is allowed to air dry and cross-link to provide the silicone rubber coating.

Table XVI—Coating Procedures

A. The porous hollow fiber membrane was dipped in undiluted liquid coating material. The excess liquid was allowed to drip off.

B. The porous hollow fiber membrane was dipped in undiluted liquid coating material while a vacuum was applied to the bore of the porous hollow fiber. After the fiber was removed the vacuum was broken and excess liquid was allowed to drip off.

C. The porous hollow fiber membrane was dipped in liquid coating material diluted with a hydrocarbon solvent. The solvent was allowed to evaporate.

D. The porous hollow fiber membrane was dipped in liquid coating material with a hydrocarbon solvent, while a vacuum was applied to the bore of the hollow fiber. After the fiber was removed the vacuum was broken and the solvent was allowed to evaporate.

E. The porous hollow fiber membrane was dipped in a solution containing coating material in the form of a polymerizable prepolymer, appropriate curing agent, and hydrocarbon solvent. The solvent was allowed to evaporate and the membrane prepolymer was cured in place.

F. The coating procedure was used as described in E, except that a vacuum was applied to the bore of the hollow fiber while it was dipped in the coating solution.

It is claimed:

1. A multicomponent membrane for gas separation comprising a coating in occluding contact with a porous separation membrane of material, which material exhibits selective permeation of at least one gas of a gaseous mixture over that of one or more remaining gases of the gaseous mixture, said porous separation membrane having a substantial void volume, wherein, with respect to at least one pair of gases, the material of the porous separation membrane exhibits a determined intrinsic separation factor greater than the determined intrinsic separation factor of the material of said coating, and the multicomponent membrane exhibits a separation factor significantly greater than the determined intrinsic separation factor of the material of said coating and greater than the separation factor exhibited by the porous separation membrane.

2. A multicomponent membrane for gas separation comprising a coating and a porous separation membrane of material, which material exhibits selective permeation of at least one gas of a gaseous mixture over that of one or more remaining gases of the gaseous mixture, said porous separation membrane being anisotropic having a substantial void volume and at least one relatively dense region within its thickness in barrier flow relationship to gas flow across the porous separation membrane, wherein the coating is in occluding contact with at least one relatively dense region, wherein with respect to at least one pair of gases consisting of one of hydrogen, helium, ammonia and carbon dioxide and one of carbon monoxide, nitrogen, argon, sulfur hexafluoride, methane and ethane, the material of the porous separation membrane exhibits a determined intrinsic separation factor greater than the determined intrinsic separation factor of the material of said coating, and the multicomponent membrane exhibits a separation factor significantly greater than the determined intrinsic separation factor of the material of the coating and greater than the separation factor exhibited by the porous separation membrane.

3. The multicomponent membrane of claim 2 in which said separation factor exhibited by the multicomponent membrane is at least about 35 percent greater than said determined intrinsic separation factor of the material of the coating and in which the void volume of the porous separation membrane is about 10 to 80 percent.

4. The multicomponent membrane of claim 3 in which, with respect to at least one gas of said pair of gases, the material of the coating has a higher permeability constant than does the material of the porous separation membrane.

5. The multicomponent membrane of claim 3 in which, with respect to at least one gas, which gas is selected from the group consisting of carbon monoxide, nitrogen, argon, sulfur hexafluoride, methane, ethane and carbon dioxide, the effective separating thickness of the multicomponent membrane is less than about 15,000 angstroms based on the permeability constant of the material of the porous separation membrane for said gas, and the ratio of total surface area to total pore cross-sectional area of the porous separation membrane is at least about $10^3:1$.

6. The multicomponent membrane of claim 3 in which the multicomponent membrane is a film.

7. The multicomponent membrane of claim 3 in which the multicomponent membrane is a hollow fiber.

8. The multicomponent membrane of claim 3 in which the coating is in contact with at least one surface of the porous separation membrane, and the coating has an average thickness up to about 50 microns.

9. The multicomponent membrane of claim 8 in which the coating is in contact with both surfaces of the porous separation membrane, and the coating in contact with each surface has an average thickness up to about 50 microns.

10. The multicomponent membrane of claim 8 in which an essentially liquid substance comprising polymerizable material is applied to the porous separation membrane, and the polymerizable material is polymerized after application to the porous separation membrane to provide the coating.

11. The multicomponent membrane of claim 3 in which the coating comprises at least two layers.

12. The multicomponent membrane of claim 3 in which the porous separation membrane comprises at least one of polysulfone, copolymer of styrene and acrylonitrile poly(arylene oxide), polycarbonate, and cellulose acetate.

13. The multicomponent membrane of claim 12 in which the coating comprises at least one of poly(siloxane), poly(isoprene), copolymer of α-methylstyrene and poly(siloxane), poly(styrene) having a degree of polymerization of about 2 to 20, and aliphatic hydrocarbyl-containing organic compounds having about 14 to 30 carbon atoms.

14. The multicomponent membrane of claim 13 in which the coating comprises at least one of aliphatic and aromatic poly(siloxane) having repeating units containing 1 to about 20 carbon atoms, and the coating is substantially non-interrupted.

15. The multicomponent membrane of claim 14 in which the poly(siloxane) is cross-linked to provide silicone rubber and has a molecular weight of about 1000 to 100,000 prior to cross-linking.

16. The multicomponent membrane of claim 12 in which the material of the porous separation membrane comprises a polysulfone, and the multicomponent membrane is a hollow fiber.

17. The multicomponent membrane of claim 16 in which the polysulfone has a repeating unit represented by

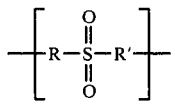

wherein each of R and R' are aliphatic or aromatic hydrocarbyl-containing moieties of 1 to about 40 carbon atoms, and the polysulfone has a molecular weight of at least about 10,000.

18. The multicomponent membrane of claim 17 in which the polysulfone has a repeating unit represented by

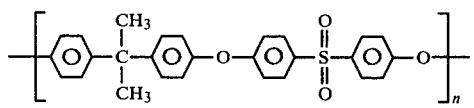

wherein n is about 50 to 80.

19. The multicomponent membrane of claim 18 in which, with respect to at least one gas, which gas is selected from the group consisting of carbon monoxide, nitrogen, argon, sulfur hexafluoride, methane, ethane and carbon dioxide, the effective separating thickness of the multicomponent membrane is less than about 5000 angstroms based on the permeability constant of the polysulfone for said gas; the porous separation membrane has a total surface area to total pore cross-sectional area of at least about $10^3:1$; and the porous separation membrane has an average pore diameter less than about 20,000 angstroms.

20. The multicomponent membrane of claim 19 in which the coating contacts at least the feed surface of the porous separation membrane.

21. The multicomponent membrane of claim 19 in which the coating contacts at least the outside surface of the hollow fiber.

22. The multicomponent membrane of claim 19 in which the coating comprises at least one of poly(siloxane), poly(isoprene), copolymer of α-methylstyrene and poly(siloxane), poly(styrene) having a degree of polymerization of about 2 to 20, and aliphatic hydrocarbyl-containing organic compounds having about 14 to 30 carbon atoms.

23. The multicomponent membrane of claim 22 in which the coating comprises at least one of aliphatic and aromatic poly(siloxane) having repeating units containing 1 to about 20 carbon atoms, and the coating is substantially non-interrupted.

24. The multicomponent membrane of claim 23 in which the poly(siloxane) is cross-linked to provide silicone rubber and has a molecular weight of about 1000 to 100,000 prior to cross-linking.

25. The multicomponent membrane of claim 24 in which the poly(siloxane) is cross-linked after being applied to the porous separation membrane.

26. Multicomponent membranes of claim 3 in which both the separation factor and the permeability of the multicomponent membrane are influenced by the ratio of total surface area to total pore cross-sectional area and by the average pore cross-sectional diameter of said porous separation membrane.

27. Multicomponent membranes of claim 3 in which both the separation factor and the permeability of the multicomponent membrane are influenced by the relative resistances to gas flow through the pores of said porous separation membrane and through the solid portions of said porous separation membrane.

28. The multicomponent membrane of claim 3 in which the multicomponent membrane exhibits a greater permeability than an annealed membrane, said annealed membrane consisting of a membrane substantially the same as the porous separation membrane of the multicomponent membrane but which membrane has been sufficiently annealed that said annealed membrane exhibits, with respect to said at least one pair of gases, a separation factor equal to or greater than the separation factor exhibited by the multicomponent membrane.

29. The multicomponent membrane of claim 3 in which the multicomponent membrane exhibits a greater permeability than a densified membrane, said densified membrane consisting of a membrane substantially the same as the porous separation membrane of the multicomponent membrane but which membrane has been treated to sufficiently densify the membrane such that said densified membrane exhibits, with respect to said at least one pair of gases, a separation factor equal to or greater than the separation factor exhibited by the multicomponent membrane.

30. The multicomponent membrane of claim 3 in which the porous separation membrane is an anisotropic hollow fiber which is capable of maintaining the configuration of the hollow fiber under gas separation conditions and in which the multicomponent membrane exhibits a greater permeability than an anisotropic hollow fiber membrane, said anisotropic hollow fiber membrane consisting of the material of the porous separation membrane and being capable of maintaining the configuration of the hollow fiber under gas separation conditions, and said anisotropic hollow fiber membrane exhibits, with respect to said at least one pair of gases, a separation factor equal to or greater than the separation factor exhibited by the multicomponent membrane.

31. In an apparatus for selectively separating at least one gas in a gaseous mixture from at least one remaining gas comprising an enclosure and a membrane within said enclosure for selectively separating said at least one gas in the gaseous mixture and providing a permeated product, said membrane having a feed surface and an opposing exit surface, and said enclosure having means to enable said gaseous mixture to be supplied said feed surface, means to enable removal of gases from the vicinity of the feed surface, and means to enable said permeated product to be removed from the vicinity of the exit surface, the improvement wherein the membrane comprises a multicomponent membrane of claim 2.

32. In an apparatus for selectively separating at least one gas in a gaseous mixture from at least one remaining gas comprising an enclosure and a membrane within said enclosure for selectively separating said at least one gas in the gaseous mixture and providing a permeated product, said membrane having a feed surface and an opposing exit surface, and said enclosure having means to enable said gaseous mixture to be supplied said feed surface, means to enable removal of gases from the vicinity of the feed surface, and means to enable said permeated product to be removed from the vicinity of the exit surface, the improvement wherein the membrane comprises a multicomponent membrane of claim 24.

33. A multicomponent membrane for gas separation comprising a coating in occluding contact with a porous separation membrane of a material, which material exhibits selective permeation of at least one gas of a gaseous mixture over that of one or more remaining gases of the gaseous mixture, said coating being applied using an essentially liquid substance suitable for forming the coating, wherein, with respect to at least one pair of gases, the material of the porous separation membrane exhibits a determined intrinsic separation factor greater than the determined intrinsic separation factor of the material of said coating, and the multicomponent membrane exhibits a separation factor significantly greater than the determined intrinsic separation factor of the material of said coating and greater than the separation factor exhibited by the porous separation membrane.

34. The multicomponent membrane of claim 33 in which said separation factor exhibited by the multicomponent membrane is at least about 35 percent greater than said determined intrinsic separation factor of the material of the coating.

35. The multicomponent membrane of claim 34 in which the coating comprises at least one of poly(isoprene), poly(siloxane), poly(styrene) having a degree of polymerization of about 2 to 20, and aliphatic hydrocarbyl-containing organic compounds having about 14 to 30 carbon atoms.

36. The multicomponent membrane of claim 35 in which the coating comprises at least one of aliphatic and aromatic poly(siloxane) having repeating units containing 1 to about 20 carbon atoms, and the coating is substantially non-interrupted.

37. The multicomponent membrane of claim 36 in which the poly(siloxane) is cross-linked to provide silicone rubber and has a molecular weight of about 1000 to 100,000 prior to cross-linking.

38. The multicomponent membrane of claim 34 in which the essentially liquid substance comprises polymerizable material, and the polymerizable material is polymerized after application to the porous separation membrane to provide the coating.

39. In an apparatus for selectively separating at least one gas in a gaseous mixture from at least one remaining gas comprising an enclosure and a membrane within said enclosure for selectively separating said at least one gas in the gaseous mixture and providing a permeated product, said membrane having a feed surface and an opposing exit surface, and said enclosure having means to enable said gaseous mixture to be supplied said feed surface, means to enable removal of gases from the vicinity of the feed surface, and means to enable said permeated product to be removed from the vicinity of the exit surface, the improvement wherein the membrane comprises a multicomponent membrane of claim 33.

40. A multicomponent membrane for gas separation comprising a coating in occluding contact with a porous separation membrane comprising polysulfone wherein, with respect to at least one pair of gases, the polysulfone exhibits a determined intrinsic separation factor greater than the determined intrinsic separation factor of the material of said coating, and the multicomponent membrane exhibits a separation factor significantly greater than the determined intrinsic separation factor of the material of said coating and greater than the separation factor exhibited by the porous separation membrane.

41. The multicomponent membrane of claim 40 in which said separation factor exhibited by the multicomponent membrane is at least about 35 percent greater than said determined intrinsic separation factor of the material of the coating and the polysulfone has a repeating unit represented by

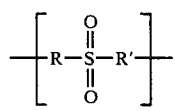

wherein each of R and R' are aliphatic or aromatic hydrocarbyl-containing moieties of 1 to about 40 carbon atoms and the polysulfone has a molecular weight of at least about 10,000.

42. The multicomponent membrane of claim 41 in which the porous separation membrane is anisotropic with a relatively dense region, and the multicomponent membrane is a hollow fiber.

43. The multicomponent membrane of claim 42 in which the polysulfone has a repeating unit represented by

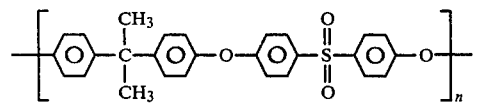

wherein n is about 50 to 80.

44. The multicomponent membrane of claim 41 in which the polysulfone comprises a poly(arylene ether)-sulfone.

45. A multicomponent membrane for gas separation comprising a coating and a hollow fiber porous separation membrane of material, which material exhibits selective permeation of at least one gas of a gaseous mixture over that of one or more remaining gases of the gaseous mixture, said porous separation membrane being anisotropic having a substantial void volume and at least one relatively dense region within its thickness in barrier flow relationship to gas flow across the porous separation membrane, wherein the coating is in occluding contact with at least one relatively dense region, wherein, with respect to at least one pair of gases, the material of the porous separation membrane exhibits a determined intrinsic separation factor greater than the determined intrinsic separation factor of the material of said coating, and the multicomponent membrane exhibits a separation factor at least about 35 percent greater than the determined intrinsic separation factor of the material of said coating and greater than the separation factor exhibited by the porous separation membrane.

46. A multicomponent membrane for a gas separation comprising a coating in occluding contact with a porous separation membrane of a material, which material exhibits selective permeation of at least one gas of a gaseous mixture over that of one or more remaining gases of the gaseous mixture, in which the porous separation membrane has a substantial void volume, wherein, with respect to at least one pair of gases, the material of the porous separation membrane exhibits a determined intrinsic separation factor greater than the determined intrinsic separation factor of the material of said coating, and the multicomponent membrane exhibits a separation factor at least about 35 percent greater than the determined intrinsic separation factor of the material of said coating and at least about 10 percent greater than the separation factor exhibited by the porous separation membrane.

47. In an apparatus for selectively separating at least one gas in a gaseous mixture from at least one remaining gas comprising an enclosure and a membrane within said enclosure for selectively separating said at least one gas in the gaseous mixture and providing a permeated product, said membrane having a feed surface and an opposing exit surface, and said enclosure having means to enable said gaseous mixture to be supplied said feed surface, means to enable removal of gases from the vicinity of the feed surface, and means to enable said permeated product to be removed from the vicinity of the exit surface, the improvement wherein the membrane comprises a multicomponent membrane of claim 1.

48. The apparatus of claim 47 in which said separation factor exhibited by the multicomponent membrane is at least about 35 percent greater than said predetermined intrinsic separation factor, and in which the void volume of the porous separation membrane is about 10 to 80 percent.

49. A process for separating at least one gas in a gaseous mixture from at least one other gas in said gaseous mixture by selective permeation and providing a permeated product containing at least one permeating gas, comprising: contacting the gaseous mixture with one surface of a multicomponent membrane, which, with respect to at least one pair of gases of said gaseous mixture, multicomponent membrane exhibits selective permeation of one gas of said pair of gases over that of the remaining gas of said pair of gases, and which multicomponent membrane comprises a coating in occluding contact with a porous separation membrane having a substantial void volume, wherein, with respect to said pair of gases, the material of the porous separation membrane exhibits a determined intrinsic separation factor greater than the determined intrinsic separation factor of the material of said coating, and the multicomponent membrane exhibits a separation factor significantly greater than the determined intrinsic separation factor of the material of the coating and greater than the separation factor exhibited by the porous separation membrane; maintaining the opposite surface of the multicomponent membrane at a lower chemical potential for said at least one permeating gas than the chemical potential at the said surface; permeating said at least one permeating gas into and through the multicomponent membrane; and removing from the vicinity of said opposite surface a permeated product having a different proportion of said at least one gas of said gaseous mixture to said at least one other gas of said gaseous mixture than the proportion in the gaseous mixture of said at least one gas to said at least one other gas.

50. A process for separating at least one gas in a gaseous mixture from at least one other gas in said gaseous mixture by selective permeation and providing a permeated product containing at least one permeating gas, comprising: contacting the gaseous mixture with one surface of a multicomponent membrane, which, with respect to at least one pair of gases of said gaseous mixture multicomponent membrane exhibits selective permeation of one gas of said pair of gases over that of the remaining gas of said pair of gases, and which multicomponent membrane comprises a coating and a porous separation membrane being anisotropic having a substantial void volume and at least one relatively dense region within its thickness in barrier flow relationship to gas flow across the porous separation membrane, wherein the coating is in occluding contact with at least one relatively dense region, wherein, with respect to said pair of gases, the material of the porous separation membrane exhibits a determined intrinsic separation factor greater than the determined intrinsic separation factor of the material of said coating, and the multicomponent membrane exhibits a separation factor significantly greater than the determined intrinsic separation factor of the material of the coating and greater than the separation factor exhibited by the porous separation membrane; maintaining the opposite surface of the multicomponent membrane at a lower chemical potential for said at least one permeating gas than the chemical potential at the said surface; permeating said at least one permeating gas into and through the multicomponent membrane; and removing from the vicinity of said opposite surface a permeated product having a different proportion of said at least one gas of said gaseous mixture to said at least one other gas of said gaseous mixture than the proportion in the gaseous mixture of said at least one gas to said at least one other gas.

51. The process of claim 50 wherein said separation factor exhibited by the multicomponent membrane is at least about 35 percent greater than said determined intrinsic separation factor of the material of the coating, and the void volume of the porous separation membrane is about 10 to 80 percent.

52. The process of claim 51 wherein the said at least one gas comprises oxygen and the gaseous mixture comprises air.

53. The process of claim 52 wherein the porous separation membrane comprises at least one of polysulfone, copolymer of styrene and acrylonitrile, poly(arylene oxide), polycarbonate, and cellulose acetate.

54. The process of claim 53 wherein the porous separation membrane comprises a polysulfone and the coating comprises at least one of poly(isoprene), poly(siloxane), poly(styrene) having a degree of polymerization of about 2 to 20, and aliphatic hydrocarbyl-containing organic compound of about 14 to 30 carbon atoms.

55. The process of claim 54 wherein the coating comprises a poly(siloxane), the multicomponent membrane is a hollow fiber, and the coating is substantially non-interrupted.

56. The process of claim 53 wherein the polysulfone has a repeating unit represented by

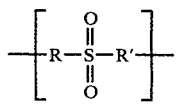

wherein each of R and R' are aliphatic or aromatic hydrocarbyl-containing moieties of 1 to about 40 carbon atoms; the polysulfone has a molecular weight of at least about 10,000 and the poly(siloxane) comprises aliphatic or aromatic poly(siloxane) having 1 to about 20 carbon atoms.

57. The process of claim 56 wherein the poly(siloxane) is cross-linked and has a molecular weight of about 1000 to 100,000 prior to cross-linking.

58. The process of claim 51 wherein said at least one gas comprises hydrogen and said at least one other gas comprises at least one of the group consisting of carbon monoxide, carbon dioxide, helium, nitrogen, oxygen, argon, hydrogen sulfide, nitrous oxide, ammonia, and hydrocarbon of 1 to about 5 carbon atoms.

59. The process of claim 58 wherein the porous separation membrane comprises at least one of polysulfone, copolymer of styrene and acrylonitrile, poly(arylene oxide), polycarbonate, and cellulose acetate.

60. The process of claim 59 wherein the porous separation membrane comprises polysulfone and the coating comprises at least one of poly(isoprene), poly(siloxane), copolymer of α-methylstyrene and poly(siloxane), poly(styrene) having a degree of polymerization of about 2 to 20, and aliphatic hydrocarbyl-containing organic compound of about 14 to 30 carbon atoms.

61. The process of claim 60 wherein the multicomponent membrane is a hollow fiber.

62. The process of claim 61 wherein the polysulfone has a repeating unit represented by

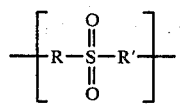

wherein each of R and R' are aliphatic or aromatic hydrocarbyl-containing moieties of 1 to about 40 carbon atoms, and the polysulfone has a molecular weight of at least about 10,000; and wherein the coating comprises aliphatic or aromatic poly(siloxane) having 1 to about 20 carbon atoms.

63. The process of claim 62 wherein the poly(siloxane) is cross-linked to provide a silicone rubber and has a molecular weight of about 1000 to 100,000 prior to cross-linking.

64. The process of claim 59 wherein the porous separation membrane comprises a poly(arylene oxide).

65. The process of claim 64 wherein the porous separation membrane comprises a brominated poly(xylylene oxide).

66. The process of claim 59 wherein the porous separation membrane comprises a copolymer of styrene and acrylonitrile containing about 20 to 70 weight percent styrene and about 30 to 80 weight percent acrylonitrile.

67. The process of claim 51 wherein said at least one gas comprises ammonia and the gaseous mixture comprises ammonia and at least one of hydrogen, nitrogen, methane, and argon.

68. The process of claim 51 wherein said at least one gas comprises carbon dioxide and the gaseous mixture comprises carbon dioxide and at least one of carbon monoxide, hydrocarbon of 1 to about 5 carbon atoms, and nitrogen.

69. The process of claim 51 wherein said at least one gas comprises helium and the gaseous mixture comprises helium and at least one hydrocarbon of 1 to about 5 carbon atoms.

70. The process of claim 51 wherein said at least one gas comprises hydrogen sulfide and the gaseous mixture comprises hydrogen sulfide and at least one hydrocarbon of 1 to about 5 carbon atoms.

71. The process of claim 51 wherein said at least one gas comprises carbon monoxide and the gaseous mixture comprises carbon monoxide and at least one of hydrogen, helium, nitrogen, and hydrocarbon of 1 to about 5 carbon atoms.

72. The process of claim 51 wherein, with respect to a gas of the gaseous mixture, the effective separating thickness of the multicomponent membrane is less than about 15,000 angstroms based on the permeability constant of the material of the porous separation membrane for said gas, and the ratio of total surface area to total pore cross-sectional area of the porous separation membrane is at least about $10^3:1$.

73. The process of claim 51 wherein the multicomponent membrane exhibits a greater permeability than an annealed membrane, said annealed membrane consisting of a membrane substantially the same as the porous separation membrane of the multicomponent membrane but which membrane has been sufficiently annealed that said annealed membrane exhibits a separation factor equal to or greater than the separation factor exhibited by the multicomponent membrane.

74. The process of claim 51 wherein the multicomponent membrane exhibits a greater permeability than a densified membrane, said densified membrane consisting of a membrane substantially the same as the porous separation membrane of the multicomponent membrane but which membrane has been treated to density the membrane such that said densified membrane exhibits a separation factor equal to or greater than the separation factor exhibited by the multicomponent membrane.

75. The process of claim 51 wherein the porous separation membrane is an anisotropic hollow fiber which is capable of maintaining the configuration of the hollow fiber under gas separation conditions and in which the multicomponent membrane exhibits a greater permeability than an anisotropic hollow fiber membrane, said anisotropic hollow fiber membrane consisting of the material of the porous separation membrane and being capable of maintaining the configuration of the hollow fiber under gas separation conditions, and said anisotropic hollow fiber membrane exhibits a separation factor equal to or greater than the separation factor exhibited by the multicomponent membrane.

76. A process for separating at least one gas in a gaseous mixture from at least one other gas in said gaseous mixture by selective permeation and providing a permeated product containing at least one permeating gas comprising: contacting the gaseous mixture with one surface of a multicomponent membrane, which, with respect to at least one pair of gases of said gaseous mixture, multicomponent membrane exhibits selective permeation of one gas of said pair of gases over that of the remaining gas of said pair of gases, and which multicomponent membrane comprises a coating in occluding contact with a porous separation membrane having a substantial void volume, wherein, with respect to said pair of gases, the material of the porous separation membrane exhibits a determined intrinsic separation factor greater than the determined intrinsic separation factor of the material of said coating, and the multicomponent membrane exhibits a separation factor at least about 35 percent greater than the determined intrinsic separation factor of the material of the coating and at least about 10 percent greater than the separation factor exhibited by the porous separation membrane; maintaining the opposite surface of the multicomponent membrane at a lower chemical potential for said at least one permeating gas than the chemical potential at the said one surface; permeating said at least one permeating gas into and through the multicomponent membrane; and removing from the vicinity of said opposite surface a permeated product having a different proportion of said at least one gas of said gaseous mixture to said at least one other gas of said gaseous mixture than that proportion in the gaseous mixture of said at least one gas to said at least one other gas.

77. A process for separating at least one gas comprising hydrogen in a gaseous mixture from at least one other gas comprising at least one of carbon monoxide, carbon dioxide, helium, nitrogen, oxygen, argon, hydrogen sulfide, nitrous oxide, ammonia and hydrocarbon of 1 to about 5 carbon atoms, in said gaseous mixture by selective permeation and providing a permeated product containing at least one permeating gas comprising: contacting the gaseous mixture with one surface of a multicomponent membrane which, with respect to at least one pair of gases of said gaseous mixture, multicomponent membrane exhibits selective permeation of one gas of said pair of gases over that of the remaining gas of said pair of gases, in which said multicomponent membrane comprises a coating in occluding contact with a porous separation membrane, wherein, with respect to said pair of gases, the material of the porous separation membrane exhibits a determined intrinsic separation factor greater than the determined intrinsic separation factor of the material of said coating, and the multicomponent membrane exhibits a separation factor significantly greater than the determined intrinsic separation factor of the material of the coating and greater than the separation factor exhibited by the porous separation membrane; maintaining the opposite surface of the multicomponent membrane at a lower chemical potential for said at least one permeating gas than the chemical potential at the said one surface; permeating said at least one permeating gas into and through the multicomponent membrane; and removing from the vicinity of said opposite surface a permeated product having a different proportion of said at least one gas to said at least one other gas than that proportion in said gaseous mixture of said at least one gas to said at least one other gas.

78. A process for separating at least one gas in a gaseous mixture from at least one other gas in said gaseous mixture by selective permeation and providing a permeated product containing at least one permeating gas comprising: contacting the gaseous mixture with one surface of a multicomponent membrane which, with respect to at least one pair of gases of said gaseous mixture, multicomponent membrane exhibits selective permeation of one gas of said pair of gases over that of the remaining gas of said pair of gases, and which membrane comprises a coating in occluding contact with a porous separation membrane comprising polysulfone, wherein, with respect to said pair of gases, the polysulfone exhibits a determined intrinsic separation factor greater than the determined intrinsic separation factor of the material of said coating, and the multicomponent membrane exhibits a separation factor at least about 35 percent greater than the determined intrinsic separation factor of the material of the coating and greater than the separation factor exhibited by the porous separation membrane; maintaining the opposite surface of the multicomponent membrane at a lower chemical potential for said at least one permeating gas than the chemical potential at the said one surface; permeating said at least one permeating gas into and through the multicomponent membrane; and removing from the vicinity of said opposite surface a permeated product having a different proportion of said at least one gas to said at least one other gas than that proportion in said gaseous mixture of said at least one gas to said at least one other gas.

* * * * *

UNITED STATES PATENT AND TRADEMARK OFFICE
CERTIFICATE OF CORRECTION

PATENT NO. : 4,230,463

DATED : October 28, 1980

INVENTOR(S) : Jay M.S. Henis and Mary K. Tripodi

It is certified that error appears in the above-identified patent and that said Letters Patent are hereby corrected as shown below:

Column 3, line 20, "come" should read ---some---.

Column 3, line 37, "those" should read ---these---.

Column 5, line 65, "performed" should read ---preformed---.

Column 6, line 56, "having" should read ---during---.

Column 7, lines 47, 48, 49, 55, "1" should read ---$\ell$---.

Column 14, line 29, "poly(acrylates)" should read ---poly(alkyl acrylates)---

Column 15, line 33,

,etc." should read

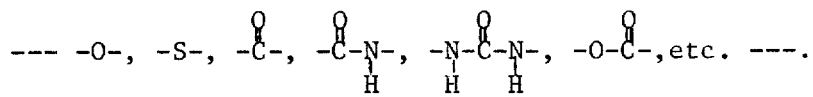
,etc. ---.

Column 19, line 64, "sulfontes" should read ---sulfones---.

Column 26, lines 26, 42, 46, 52, "1" should read ---$\ell$---.

Column 27, lines 7, 15, 20, 23, 37, 40, "1" should read ---$\ell$---.

Column 28, line 23, "1" should read ---$\ell$---.

Column 29, lines 7, 11, 19, 24 "1" should read ---$\ell$---.

Column 33 and Column 34, Table II, in Example No. 6, last item, "$6.5 \times 10^{-6}$" should read --- $4.9 \times 10^{-6}$ ---.

Column 34, line 32, "procedure" should read -procedures---.

Column 37, line 19, delete redundant appearance of "the".

UNITED STATES PATENT AND TRADEMARK OFFICE
CERTIFICATE OF CORRECTION

PATENT NO. : 4,230,463           Page 2 of 2

DATED : October 28, 1980

INVENTOR(S) : Jay M.S. Henis and Mary K. Tripodi

It is certified that error appears in the above-identified patent and that said Letters Patent are hereby corrected as shown below:

Column 37, lines 31, 37, "1" should read ---$\ell$---.

Column 37, Table VI, "Multicomponent Membrane$^b$ should read
            P/1(x10$^6$)a"

---Multicomponent Membrane$^b$
            P/$\ell$(x10$^6$)a---.

Column 38, lines 14, 16, "1" should read ---$\ell$---.

Column 44, Example 41, line 59, delete "25".

Column 45, line 27, "IX" should read ---XI---.

Column 45, line 29, "members" should read ---membrane---.

Column 49, Table XIII, "Sylgard 1.9" should read ---Sylgard 184 1.9---.

Column 51, line 21, "and" first appearance, should read ---an---.

Column 51, line 43, "efect" should read ---effect---.

Claim 56, column 59, line 59, insert "," after ---10,000---.

Signed and Sealed this

Eleventh Day of August 1981

[SEAL]

Attest:

GERALD J. MOSSINGHOFF

Attesting Officer    Commissioner of Patents and Trademarks